US012148219B2

United States Patent
Li et al.

(10) Patent No.: US 12,148,219 B2
(45) Date of Patent: Nov. 19, 2024

(54) METHOD, APPARATUS, AND COMPUTING DEVICE FOR LANE RECOGNITION

(71) Applicant: Huawei Technologies Co., Ltd., Shenzhen (CN)

(72) Inventors: Donghu Li, Hangzhou (CN); Zhichang Lv, Hangzhou (CN); Yueqiang Lyu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 379 days.

(21) Appl. No.: 17/680,939

(22) Filed: Feb. 25, 2022

(65) Prior Publication Data
US 2022/0237919 A1 Jul. 28, 2022

Related U.S. Application Data

(63) Continuation of application No. PCT/CN2020/081136, filed on Mar. 25, 2020.

(30) Foreign Application Priority Data

Aug. 28, 2019 (CN) .......................... 201910804345.5
Dec. 18, 2019 (CN) .......................... 201911315389.8

(51) Int. Cl.
*G06V 20/64* (2022.01)
*G06T 7/70* (2017.01)
*G06V 20/54* (2022.01)

(52) U.S. Cl.
CPC ................ *G06V 20/54* (2022.01); *G06T 7/70* (2017.01); *G06T 2207/10016* (2013.01);
(Continued)

(58) Field of Classification Search
CPC ...... G06V 20/54; G06V 2201/08; G06T 7/70; G06T 2207/10016; G06T 2207/30236;
(Continued)

(56) References Cited

U.S. PATENT DOCUMENTS 10,545,029 B2 * 1/2020 Yang .................. G01C 21/3811
10,928,830 B1 * 2/2021 Tran ..................... G05D 1/0246
(Continued)

FOREIGN PATENT DOCUMENTS

CA 2927925 A1 7/2016
CN 102201165 A 9/2011
(Continued)

OTHER PUBLICATIONS

Brendan Tran Morris, et al., "Learning, Modeling, and Classification of Vehicle Track Patterns from Live Video," IEEE Transactions on Intelligent Transportation Systems, vol. 9, No. 3, Sep. 2008, XP055957767, 13 pages.
(Continued)

*Primary Examiner* — Aaron W Carter
(74) *Attorney, Agent, or Firm* — Conley Rose, P.C.

(57) ABSTRACT

A method for lane recognition includes, when recognizing a lane in a video, obtaining the video recorded by a monitoring device set up on a road, where the video records a plurality of vehicles running on the road; determining positions of each vehicle in a plurality of video frames of the video; determining a vehicle trajectory of each vehicle in the video based on the positions of the vehicle in the video frames of the video; and recognizing at least one lane in the video based on vehicle trajectories of the vehicles in the video.

20 Claims, 12 Drawing Sheets

(52) U.S. Cl.
CPC ............... *G06T 2207/30236* (2013.01); *G06T 2207/30241* (2013.01); *G06V 2201/08* (2022.01)

(58) Field of Classification Search
CPC ...... G06T 2207/30241; G01C 21/3602; G01C 21/3658; G08G 1/0116; G08G 1/056; G08G 1/04
See application file for complete search history.

(56) References Cited

U.S. PATENT DOCUMENTS

| | | | | |
|---|---|---|---|---|
| 11,003,919 | B1* | 5/2021 | Ghadiok | H04N 7/181 |
| 11,068,713 | B1* | 7/2021 | Li | G06V 20/17 |
| 11,164,014 | B1* | 11/2021 | Ghadiok | G06N 3/045 |
| 2007/0225895 | A1* | 9/2007 | Ma | G08G 1/04 348/139 |
| 2009/0287404 | A1 | 11/2009 | Dekock et al. | |
| 2010/0322476 | A1* | 12/2010 | Kanhere | G06V 10/763 382/103 |
| 2014/0129073 | A1 | 5/2014 | Ferguson | |
| 2014/0195138 | A1 | 7/2014 | Stelzig et al. | |
| 2015/0025789 | A1* | 1/2015 | Einecke | G06V 20/588 701/408 |
| 2015/0117704 | A1* | 4/2015 | Bulan | G06T 7/269 382/103 |
| 2015/0321699 | A1* | 11/2015 | Rebhan | B60W 30/18163 701/23 |
| 2018/0181817 | A1 | 7/2018 | Yan et al. | |
| 2019/0071071 | A1* | 3/2019 | Yamada | B60W 50/0097 |
| 2019/0347821 | A1* | 11/2019 | Stein | G06V 10/772 |
| 2020/0167576 | A1* | 5/2020 | Gonzalez | G06V 20/588 |
| 2020/0255027 | A1* | 8/2020 | Kulkarni | G01C 21/3602 |
| 2021/0174098 | A1* | 6/2021 | Li | G06T 7/536 |
| 2021/0197828 | A1* | 7/2021 | Kumano | G06V 20/58 |
| 2021/0347362 | A1* | 11/2021 | Bowyer | B60W 60/00274 |
| 2022/0001872 | A1* | 1/2022 | Taieb | B60W 60/0011 |
| 2022/0051028 | A1* | 2/2022 | Nakano | G08G 1/04 |
| 2022/0082403 | A1* | 3/2022 | Shapira | G06V 20/58 |
| 2022/0198706 | A1* | 6/2022 | Su | G01C 21/3602 |
| 2022/0237919 | A1* | 7/2022 | Li | G01C 21/3602 |
| 2022/0309806 | A1* | 9/2022 | Zhou | G06V 20/588 |
| 2023/0098014 | A1* | 3/2023 | Kim | G08G 1/0116 701/117 |
| 2023/0168683 | A1* | 6/2023 | Chen | B62D 15/0255 701/23 |
| 2023/0278556 | A1* | 9/2023 | Kim | B60W 30/165 |
| 2023/0298361 | A1* | 9/2023 | Yang | G06V 20/588 382/104 |
| 2023/0349719 | A1* | 11/2023 | Horihata | G01C 21/3815 |

FOREIGN PATENT DOCUMENTS

| | | |
|---|---|---|
| CN | 103366571 A | 10/2013 |
| CN | 104870288 A | 8/2015 |
| CN | 105260699 A | 1/2016 |
| CN | 104102905 B | 3/2018 |
| CN | 108615358 A | 10/2018 |

OTHER PUBLICATIONS

"Tracking," Wikipedia, https://en.wikipedia.org/w/index.php?title=Trackingandoldid=907054667, Jul. 20, 2019, XP055957857, 2 pages.

* cited by examiner

METHOD, APPARATUS, AND COMPUTING DEVICE FOR LANE RECOGNITION

CROSS-REFERENCE TO RELATED APPLICATIONS

This is a continuation of International Patent Application No. PCT/CN2020/081136 filed on Mar. 25, 2020, which claims priority to Chinese Patent Application No. 201911315389.8 filed on Dec. 18, 2019 and Chinese Patent Application No. 201910804345.5 filed on Aug. 28, 2019. The disclosures of the aforementioned applications are hereby incorporated by reference in their entireties.

TECHNICAL FIELD

This disclosure relates to the field of intelligent transportation technologies, and in particular, to a method, an apparatus, and a computing device for lane recognition.

BACKGROUND

As intelligent transportation develops, at present, traffic conditions on a road are usually monitored by using a large quantity of monitoring devices, and are then analyzed and controlled based on videos recorded by the monitoring devices. When the traffic conditions are analyzed and controlled based on the videos recorded by the monitoring devices, a position of a lane line on the road in a video recorded by each monitoring device usually needs to be obtained, to determine a position of a lane in the video. Based on the position of the lane in the video, analysis of traffic events can be performed. For example, analysis of a traffic flow and confirmation of traffic violations can be performed. Accuracy of determining the position of the lane in the video directly affects accuracy of subsequently analyzing traffic events and a traffic flow. Therefore, a more accurate determining manner is needed.

In a related technology, images of a video recorded by each camera are manually checked in advance, a position of a lane line in the video is manually marked in the images of the video recorded by each camera (that is, a pixel position of the lane line in the video recorded by each camera is predetermined based on a video footage), and the manually marked position of the lane line in the video is stored in a system. In a subsequent process of analyzing traffic events, after a video recorded by a monitoring device is obtained, a traffic event and the like can be determined based on a manually pre-marked position of a lane in the video. However, in some cases (for example, when a shooting angle of a monitoring device has changed), because the change of the shooting angle of the monitoring device cannot be discovered in a timely manner, applying the manually marked lane to a video recorded after the shooting angle is changed may cause a deviation of a position of the marked lane in the video from an actual position of the current lane in the video, and further cause an inaccurate analysis result of a traffic event.

SUMMARY

This disclosure provides a method, an apparatus, and a computing device for lane recognition, to dynamically recognize a lane in a video, and improve accuracy of lane recognition.

According to a first aspect, this disclosure provides a method for lane recognition, where the method may be performed by a recognition apparatus. Further, the recognition apparatus may obtain a video recorded by a monitoring device set up on a road, where the video records vehicles on the road that pass a shooting area of the monitoring device. Then, the recognition apparatus inputs the video into a vehicle detection model, to obtain positions of each vehicle in a plurality of video frames of the video (where the positions are pixel positions of the vehicle in the video frames). The recognition apparatus determines a vehicle trajectory of each vehicle in the video based on the positions of the vehicle in the plurality of video frames of the video. Then, the recognition apparatus recognizes at least one lane in the video based on vehicle trajectories of the plurality of vehicles in the video.

In the foregoing method, a lane in a video can be determined dynamically based on the video, and does not need to be determined through manual pre-check of video images. Even if a shooting angle of the monitoring device changes, the recognition apparatus can obtain a lane in the video in a timely manner after the angle change, thereby improving accuracy of a result of analyzing a traffic event.

In a possible implementation, the recognition apparatus may input the video into a vehicle type detection model, to obtain a type of each vehicle in the video, where a vehicle type may include a bus, a car, a coach, and the like. The recognition apparatus may determine a vehicle trajectory on each lane, and for any recognized lane, the recognition apparatus may determine, based on a vehicle trajectory on the lane and a type of a vehicle having the vehicle trajectory on the lane, a lane type of the lane. For any lane, the lane type of the lane is used to indicate a type of a vehicle that can run on the lane.

In this way, a lane type of a recognized lane in the video is further recognized, to provide a reference for determining whether a vehicle runs on a lane on which the vehicle is allowed.

In a possible implementation, the video obtained by the recognition apparatus is a video recorded before a vehicle enters an intersection, and the road on which the monitoring device performs recording includes an intersection. The recognition apparatus may obtain an extension video recorded by the monitoring device, where the extension video is a video recorded in a time period after the monitoring device records the video. To be specific, the extension video is a video recorded when the vehicle passes the intersection. Then, the recognition apparatus may input the extension video into the vehicle detection model, to obtain positions of each vehicle in a plurality of video frames of the extension video. The recognition apparatus determines a vehicle trajectory of each vehicle in the extension video based on the positions of the vehicle in the plurality of video frames of the extension video. Then, the recognition apparatus may determine vehicle trajectories of a same vehicle based on an attribute (such as a license plate number) of the vehicle that is in the plurality of vehicles and to which a vehicle trajectory in the extension video belongs and an attribute of the vehicle to which an obtained vehicle trajectory in the video belongs. The recognition apparatus determines a vehicle trajectory that is in the vehicle trajectories of the same vehicle and that is of the vehicle at the intersection as an extension vehicle trajectory corresponding to the obtained vehicle trajectory in the video. Then, the recognition apparatus determines an attribute of each lane based on the vehicle trajectories of the plurality of vehicles in the video and extension vehicle trajectories of the plurality of vehicles in the extension video.

The attribute of each lane may include any one of the following attributes or a combination thereof: a right-turn lane, a left-turn lane, a straight-through lane, a right-turn and straight-through lane, a left-turn and straight-through lane, and an all-purpose lane. The right-turn lane is a lane for a vehicle to turn right only, the left-turn lane is a lane for a vehicle to turn left only, the straight-through lane is a lane for a vehicle to go straight only, the right-turn and straight-through lane is a lane for a vehicle to turn right or go straight, the left-turn and straight-through lane is a lane for a vehicle to turn left or go straight, the all-purpose lane is a lane for a vehicle to turn right, turn left, or go straight.

In this way, the attribute of the lane is recognized, to provide a reference for determining whether a vehicle runs on a correct lane when passing an intersection.

In a possible implementation, for any vehicle trajectory in the video, it is assumed that the vehicle trajectory is a vehicle trajectory of a first vehicle, and the recognition apparatus may determine a lane that is in the recognized lane and that is nearest to the vehicle trajectory of the first vehicle, that is, obtain an adjacent lane of the vehicle trajectory of the first vehicle. Then, the recognition apparatus determines a distance between the vehicle trajectory of the first vehicle and the adjacent lane, and compares the distance and a pixel width of the first vehicle in the video (briefly referred to as a pixel width of the first vehicle). If the distance between the vehicle trajectory of the first vehicle and the adjacent lane is greater than the pixel width of the first vehicle, the recognition apparatus may determine a new lane based on the vehicle trajectory of the first vehicle, where the new lane is a lane recognized in the video. In addition, if the distance between the vehicle trajectory of the first vehicle and the adjacent lane is less than or equal to the pixel width of the first vehicle, the recognition apparatus may determine that the vehicle trajectory of the first vehicle belongs to the adjacent lane of the vehicle trajectory of the first vehicle.

In this way, for a vehicle trajectory of any vehicle, because a pixel width of the vehicle and a distance between the vehicle trajectory of the vehicle and an adjacent lane of the vehicle trajectory of the vehicle can be directly used to recognize a new lane, so that a lane in the video can be recognized quickly.

In a possible implementation, the recognition apparatus may determine vehicle trajectories on various lanes after the lanes in the video are determined, to further determine a quantity of vehicle trajectories on the lanes. The recognition apparatus determines a quantity of vehicle trajectories on each lane within a time period as a traffic flow on the lane in the video, to provide a reference and the like for adjusting duration of traffic lights at an intersection.

In a possible implementation, after recognizing the lane in the video, the recognition apparatus may obtain an actual quantity (that is, a preset quantity) of detected lanes in the video. Then, the recognition apparatus may compare the quantity of recognized lanes and the preset quantity. When the quantity of recognized lanes is not equal to the preset quantity, the recognition apparatus inputs the vehicle trajectories of the plurality of vehicles in the video and the preset quantity into an aggregation processing algorithm, and an output is the preset quantity of vehicle trajectories obtained through aggregation of the vehicle trajectories of the plurality of vehicles in the video. The recognition apparatus determines lane lines of a corrected lane based on two adjacent vehicle trajectories, to obtain at least one corrected lane in the video. Alternatively, the recognition apparatus obtains a lane recognition line (which is a straight line used to mark a to-be recognized lane), to determine an intersection point of each vehicle trajectory in the vehicle trajectories of the plurality of vehicles in the video and the lane recognition line. Then, the recognition apparatus inputs coordinates of all intersection points and the preset quantity into the aggregation processing algorithm, and an output is the preset quantity of intersection points. The recognition apparatus determines a central point of each intersection point, and determines a straight line that is in straight lines in which each central point is located and that is perpendicular to the lane recognition line as a central line of a lane. Then, the recognition apparatus determines a central line of two adjacent central lines as a lane line of a lane. For a lane to which a left-side central line belongs, the central line is a right lane line of the lane, and for a lane to which a right-side central line belongs, the central line is a left lane line of the lane. In this way, the recognition apparatus may obtain the at least one corrected lane in the video.

In this way, when lane recognition is inaccurate, a lane in a video can be corrected, so that accuracy of final lane recognition is improved.

In a possible implementation, before lane recognition, a lane recognition line may be marked in a video frame of the video by a staff member, where the lane recognition line may cover a to-be-detected lane. Alternatively, after obtaining the video, the recognition apparatus may determine a line segment, in the video frame of the video, that is at a preset distance from a bottom part of the video frame and that is parallel to the bottom part of the video frame as a lane recognition line, where a length of the line segment is a preset length. The recognition apparatus may obtain the lane recognition line, and then determine a straight line that is perpendicular to the lane recognition line and that crosses with a left-side end point of the lane recognition line as a left boundary of a to-be-recognized area, and the recognition apparatus may determine a straight line that is perpendicular to the lane recognition line and that crosses with a right-side end point of the lane recognition line as a right boundary of the to-be-recognized area. In this way, the recognition apparatus may determine the to-be-recognized area. Then, the recognition apparatus may recognize at least one lane in the to-be-recognized area in the video based on vehicle trajectories of the plurality of vehicles in the to-be-recognized area in the video.

In this way, when there is a plurality of lanes in the video, only a part of the lanes may be recognized based on requirements, thereby improving applicability of the solutions of this disclosure.

In a possible implementation, the recognition apparatus receives in real time a video stream recorded by the monitoring device set up on the road. In this way, a lane in the video can be recognized in real time. Alternatively, the recognition apparatus periodically obtains a video recorded by the monitoring device set up on the road. In this way, a lane in the video recorded by the camera lens can be recognized based on a historical video. The foregoing different methods for obtaining a video are applicable to different application scenarios, so that there is higher applicability in the solutions.

According to a second aspect, this disclosure provides an apparatus for lane recognition. The apparatus includes an obtaining module, a determining module, and a recognition module. The obtaining module is configured to obtain a video recorded by a monitoring device set up on a road, where the video records a plurality of vehicles running on the road. The determining module is configured to determine positions of each of the plurality of vehicles in a plurality of video frames of the video, and determine a vehicle trajectory of each vehicle in the video based on the positions of the vehicle in the plurality of video frames of the video. The recognition module is configured to recognize at least one lane in the video based on vehicle trajectories of the plurality of vehicles in the video.

In this way, because the recognition apparatus can determine the lane in the video based on the video, and manual pre-determining is not required, even if a shooting angle of the monitoring device changes, the recognition apparatus can obtain a lane in the video after the angle change in a timely manner, thereby improving accuracy of lane recognition, and further improving accuracy of a result of analyzing a traffic event.

In a possible implementation, the determining module is further configured to determine a type of each vehicle based on a vehicle type detection model, determine, based on types of the plurality of vehicles and the vehicle trajectories of the plurality of vehicles in the video, a lane type of each recognized lane in the video, where the lane type is used to indicate a type of a vehicle that can run on the lane.

In a possible implementation, the determining module is further configured to, when the road on which the monitoring device performs recording includes an intersection, obtain an extension video recorded by the monitoring device, where the extension video is a video recorded in a time period after the monitoring device records the video, determine vehicle trajectories of the plurality of vehicles in the extension video, and determine, based on the vehicle trajectories of the plurality of vehicles in the video and the vehicle trajectories of the plurality of vehicles in the extension video, an attribute of each recognized lane in the video, where the attribute of the lane includes any one of the following attributes or a combination thereof: a right-turn lane, a left-turn lane, a straight-through lane, a right-turn and straight-through lane, a left-turn and straight-through lane, and an all-purpose lane.

In a possible implementation, the recognition module is configured to determine a distance between a vehicle trajectory of a first vehicle and an adjacent lane in the video, where the adjacent lane is a lane that is in the recognized lane and that is nearest to the vehicle trajectory of the first vehicle, compare the distance and a pixel width of the first vehicle, and determine that the distance is greater than the pixel width of the first vehicle, and determine a new lane based on the vehicle trajectory of the first vehicle, where the new lane is a lane in the at least one recognized lane.

In a possible implementation, the determining module is further configured to calculate a traffic flow on each lane in the video.

In a possible implementation, the recognition module is further configured to, when a quantity of the recognized lanes is not equal to a preset quantity, obtain at least one corrected lane in the video based on the preset quantity and the vehicle trajectory of each vehicle in the video, where the preset quantity is an actual quantity of detected lanes in the video.

In a possible implementation, the determining module is further configured to determine a to-be-recognized area in the video. The recognition module is configured to recognize at least one lane in the to-be-recognized area in the video based on vehicle trajectories of the plurality of vehicles in the to-be-recognized area in the video.

In a possible implementation, the obtaining module is configured to receive in real time a video stream recorded by the monitoring device set up on the road, or periodically obtain a video recorded by the monitoring device set up on the road.

According to a third aspect, this disclosure provides a computing device for lane recognition. The computing device includes a processor and a memory, where the memory stores computer instructions, and the processor executes the computer instructions, to enable the computing device to implement the method according to the first aspect and the possible implementations of the first aspect.

According to a fourth aspect, this disclosure provides a computer-readable storage medium. The computer-readable storage medium stores computer instructions, and when the computer instructions in the computer-readable storage medium are executed by a computing device, the computing device is enabled to perform the method according to the first aspect and the possible implementations of the first aspect, or the computing device is enabled to implement functions of the apparatus according to the second aspect and the possible implementations of the second aspect.

According to a fifth aspect, this disclosure provides a computer program product including instructions, and when the computer program product runs on a computing device, the computing device is enabled to perform the method according to the first aspect and the possible implementations of the first aspect, or the computing device is enabled to implement functions of the apparatus according to the second aspect and the possible implementations of the second aspect.

BRIEF DESCRIPTION OF DRAWINGS

To describe the technical solutions in some of the embodiments of this disclosure more clearly, the following briefly describes the accompanying drawings for some of the embodiments.

DESCRIPTION OF EMBODIMENTS

Figure 1:
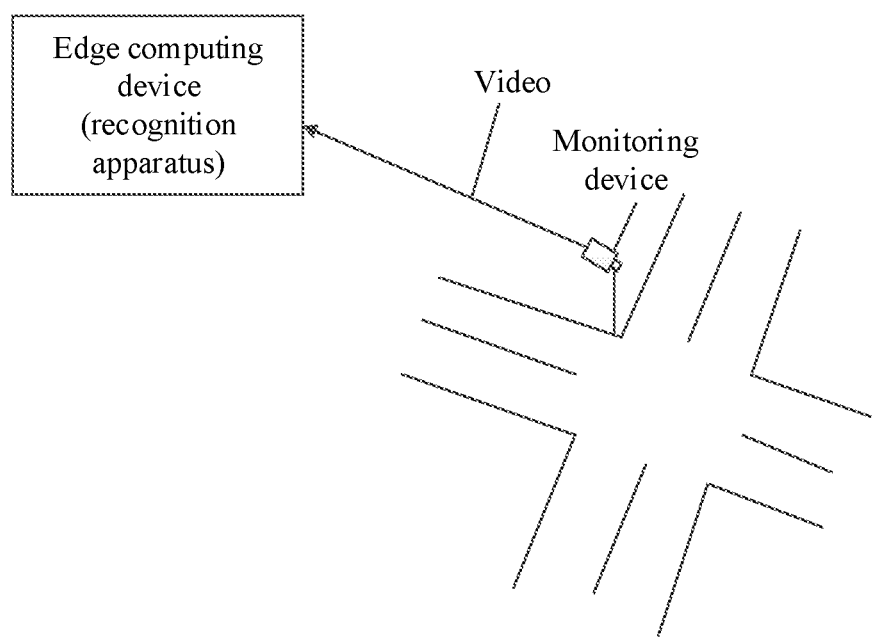
FIG. 1 is a diagram of an architecture of a system for lane recognition according to an example embodiment of this disclosure.

The following describes the solutions in the embodiments provided in this disclosure with reference to the accompanying drawings in this disclosure.

For ease of understanding embodiments of this disclosure, the following first describes concepts of terms mentioned in the embodiments of this disclosure:

1. Lane: In the embodiments of this disclosure, the lane indicates a part for a single row of vehicles to run in a video recorded by a camera set up on a road. When cameras record different roads, a quantity of lanes and a width of a lane may also vary. In the embodiments of this disclosure, lane recognition means recognition of a position of a lane on a road in a video, that is, recognition of a pixel coordinate sequence of the lane in the video (or a pixel coordinate and direction of the lane in the video).

2. Lane line: In the embodiments of this disclosure, the lane line indicates a boundary a lane in a video, where a lane may include a left lane line and a right lane line.

3. Monitoring device: The monitoring device is configured to monitor running information of a vehicle in a traffic area. In the embodiments of this disclosure, the monitoring device may be set up at an intersection or a position on a road (for example, a center on the road or a road side), and is configured to monitor a vehicle within a shooting area. The monitoring device may be a device, such as a camera or a camera device, that can capture images or record a video. Further, the monitoring device may be a barrier gate device configured to monitor a vehicle that passes a specific site (for example, a toll station, a traffic or security stop, an intersection, or a road section) in a traffic area. The monitoring device may alternatively be an electronic police monitoring device, where content of data recorded by the electronic police monitoring device and content of data recorded by the barrier gate device are similar.

In a traffic area, monitoring devices may be set up only at some intersections. For example, monitoring devices can be set up on a main road section, a road section likely to have traffic jam, a road section with frequent incidents, and at key intersections in the traffic area. An angle of view (a shooting area) of a monitoring device at an intersection may cover all lanes at the intersection, and in this case, the monitoring device set up at the intersection can shoot vehicles on all the lanes that pass the intersection. An angle of view (a shooting area) of a monitoring device at an intersection may alternatively cover only a lane in some directions at the intersection, and in this case, the monitoring device set up at the intersection can alternatively shoot only vehicles on a part of lanes that pass the intersection.

In the traffic area, for determining a traffic flow in various directions at an intersection, checking out a traffic event, and the like, a lane needs to be marked out in a video recorded by the monitoring device. For example, when whether there is a traffic incident of line crossing is decided, a lane line of a lane can be marked out in the video, and then whether a vehicle in the video rides on the lane line is determined, to further determine whether the vehicle has crossed the line. In a related technology, a lane is marked out in a video by a person, to obtain mark information, where the mark information may include a pixel coordinate sequence of a lane line of the lane in the video, width information of each lane, and the like. Then the mark information is stored, so that after a device for detecting a subsequent traffic event obtains the video recorded by a monitoring device, the lane in the video is directly determined based on the mark information, to further determine the traffic event and the like. However, in some cases (for example, in which there is a sabotage, natural disaster, and a fault in a support of the monitoring device), because a change of a shooting angle of the monitoring device cannot be discovered in a timely manner, applying a lane marked in a video recorded at a shooting angle before the change to a currently recorded video may cause a deviation of the marked lane from an actual lane recorded in the video, and further cause inaccurate detection of a traffic event or a traffic flow. Therefore, a method for recognizing a lane in a video dynamically based on content in the video needs to be provided.

Before a method for lane recognition provided in the embodiments of this disclosure is described, a system architecture to which the embodiments of this disclosure are applicable is described.

The method for lane recognition provided in the embodiments of this disclosure may be used to recognize a lane in a video. The method for lane recognition may be performed by a recognition apparatus. The recognition apparatus may be a hardware apparatus such as a server or a terminal computing device, or may be a software apparatus (such as a series of software programs that can be run on the hardware apparatus).

The recognition apparatus is flexibly deployed, and may be deployed in an edge environment. For example, the recognition apparatus may be an edge computing device in the edge environment or a software apparatus running in one or more edge computing devices. The edge environment refers to a data center or a set of edge computing devices that is relatively close to a to-be-detected road. The edge environment includes one or more edge computing devices, and the edge computing device may be a roadside device having a computing capability set up on a side of a road. For example, as shown in FIG. 1, the recognition apparatus is deployed at a position relatively close to an intersection. That is, the recognition apparatus is an edge computing device on a road side, or the recognition apparatus is a software apparatus running in the edge computing device on the road side. The intersection is provided with a monitoring device that can be connected to a network. The monitoring device records a video that shows passing vehicles at the intersection, and sends the video to the recognition apparatus through the network. The recognition apparatus recognizes a lane in the video based on the video.

Figure 2:
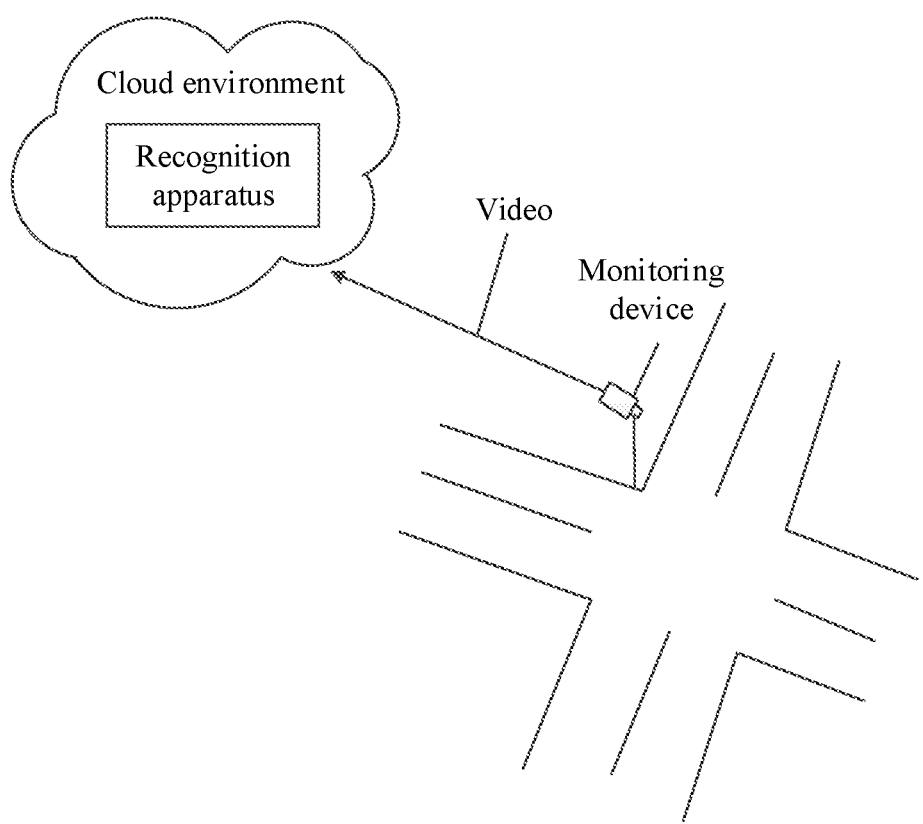
FIG. 2 is a diagram of an architecture of a system for lane recognition according to an example embodiment of this disclosure.

The recognition apparatus may alternatively be deployed in a cloud environment, where the cloud environment is an entity providing cloud services to users by using basic resources in a cloud computing mode. The cloud environment includes a cloud data center and a cloud service platform, where the cloud data center includes a large quantity of basic resources (including computing resources, storage resources, and network resources) of a cloud service provider, and the computing resources included in the cloud data center may be a large quantity of computing devices (such as servers). The recognition apparatus may be a server in the cloud data center for recognizing a lane in a video, the recognition apparatus may be a virtual machine created in the cloud data center for recognizing a lane in a video, or the recognition apparatus may be a software apparatus deployed on a server or virtual machine in the cloud data center, where the software apparatus is configured to recognize a lane in a video, and the software apparatus may be distributed on a plurality of servers, distributed on a plurality of virtual machines, or distributed on a server and a virtual machine. For example, as shown in FIG. 2, the recognition apparatus is deployed in a cloud environment, and the monitoring device that is set up on a road side and that can be connected to a network sends a recorded video to the recognition apparatus in the cloud environment. The recognition apparatus recognizes a lane in the video based on the video.

The recognition apparatus may be deployed in the cloud data center by a cloud service provider. The cloud service provider abstracts a function of the recognition apparatus into a cloud service, and a user may get information and buy the cloud service on the cloud service platform. After the user buys the cloud service, a lane recognition service provided by the recognition apparatus in the cloud data center can be used. The recognition apparatus may alternatively be deployed by a renter in a computing resource (such as a virtual machine) of a cloud data center rented by the renter. The renter buys a computing resource cloud service provided by a cloud service provider on the cloud service platform, and the recognition apparatus runs in the bought computing resource, to enable the recognition apparatus to recognize a lane in the video.

Figure 3:
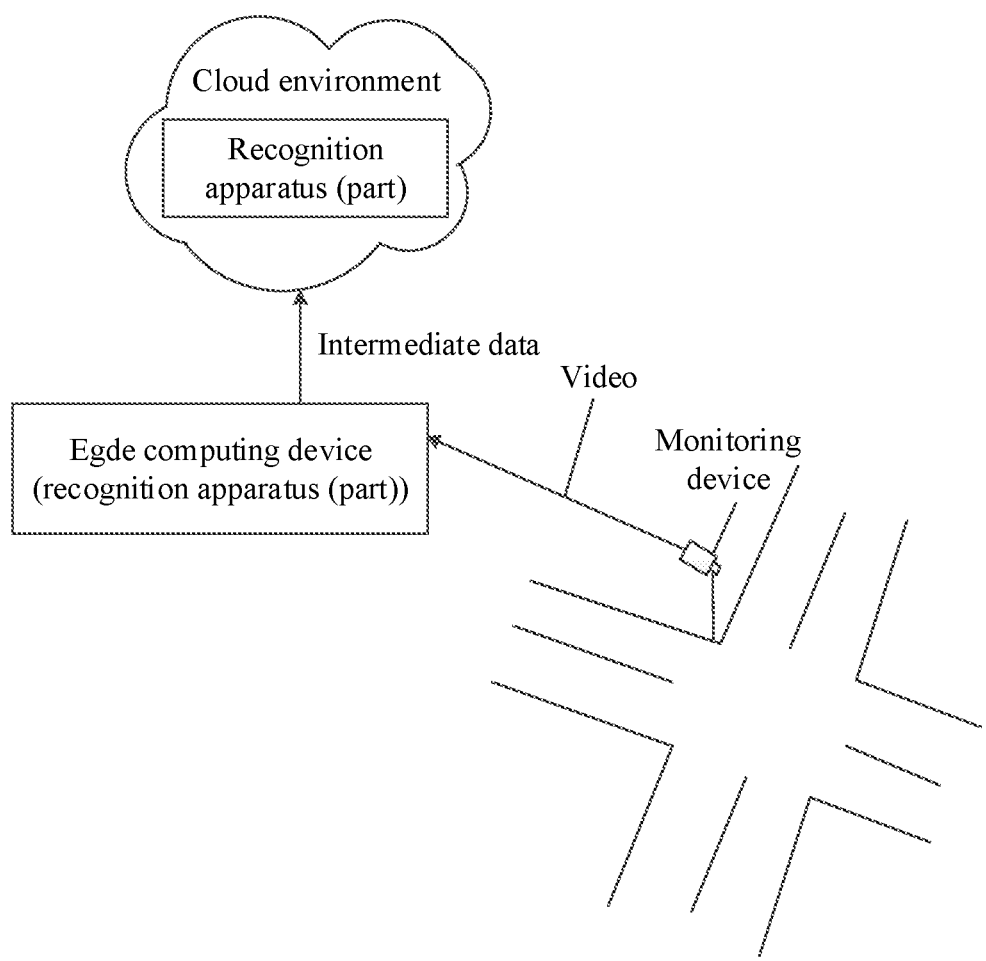
FIG. 3 is a diagram of an architecture of a system for lane recognition according to an example embodiment of this disclosure.

When the recognition apparatus is a software apparatus, the recognition apparatus may be logically divided into a plurality of parts, and the parts have different functions (where the recognition apparatus may include the plurality of parts, for example, an obtaining module, a determining module, and a recognition module). Several parts of the recognition apparatus may be separately deployed in different environments or on different devices, and the several parts of the recognition apparatus that are separately deployed in different environments or on different devices cooperate with each other to implement a lane recognition function. For example, as shown in FIG. 3, one part of the recognition apparatus (such as the obtaining module) is deployed in an edge computing device, and the other part of the recognition apparatus (such as the determining module and the recognition module) are deployed in the cloud data center (for example, in a server or virtual machine in the cloud data center). The monitoring device set up on the road sends a recorded video to the obtaining module deployed in the edge computing device, the obtaining module sends the video to the cloud data center, and the determining module and the recognition module deployed in the cloud data center analyze the video, to obtain a lane in the video. It should be understood that, division of the recognition apparatus into various parts is not limited in this disclosure, and an environment in which the recognition apparatus is further deployed is not limited in this disclosure. In actual application, adaptable deployment can be implemented based on computing capabilities of various computing devices or specific application requirements. It should be noted that, in an embodiment, the monitoring device may alternatively be an intelligent camera having some computing capabilities. The recognition apparatus may further be deployed in three parts. One part is deployed in the monitoring device, another part is deployed in an edge computing device, and still another part is deployed in a cloud computing device.

Figure 4:
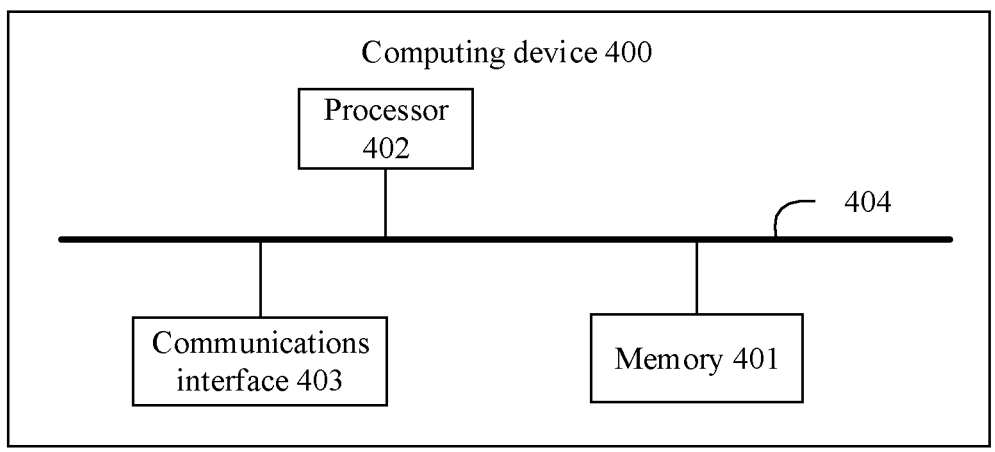
FIG. 4 is a schematic diagram of a structure of a computing device according to an example embodiment of this disclosure.

When the recognition apparatus is a software apparatus, the recognition apparatus may alternatively be deployed independently on a computing device in any environment (such as a cloud environment, an edge environment, or a terminal computing device), or when the recognition apparatus is a hardware device, the recognition apparatus may be a computing device 400 in any environment. FIG. 4 is a schematic diagram of a structure of a computing device 400. The computing device 400 shown in FIG. 4 includes a memory 401, a processor 402, a communications interface 403, and a bus 404. The memory 401, the processor 402, and the communications interface 403 are connected to and communicate with each other through the bus 404.

The memory 401 may be a read-only memory (ROM), a static storage device, a dynamic storage device, or a random-access memory (RAM). The memory 401 may store computer instructions, and when the computer instructions stored in the memory 401 are executed by the processor 402, the processor 402 and the communications interface 403 are configured to perform a method for lane recognition. The memory may further store data. For example, a part of the memory 401 is used to store data required for the method for lane recognition, and is used to store intermediate data or result data in a process of program execution.

The processor 402 may use a general-purpose central processing unit (CPU), an application-specific integrated circuit (ASIC), a graphics processing unit (GPU), or any combination thereof. The processor 402 may include one or more chips, and the processor 402 may include an artificial intelligence (AI) accelerator such as a neural network processing unit (NPU).

The communications interface 403 uses but is not limited to a transceiver module such as a transceiver, to implement communication between the computing device 400 and another device or a communications network. For example, the communications interface 403 may be used to obtain data required for lane recognition.

The bus 404 may include a channel for transmitting information between the components (for example, the memory 401, the processor 402, and the communications interface 403) of the computing device 400.

Figure 5:
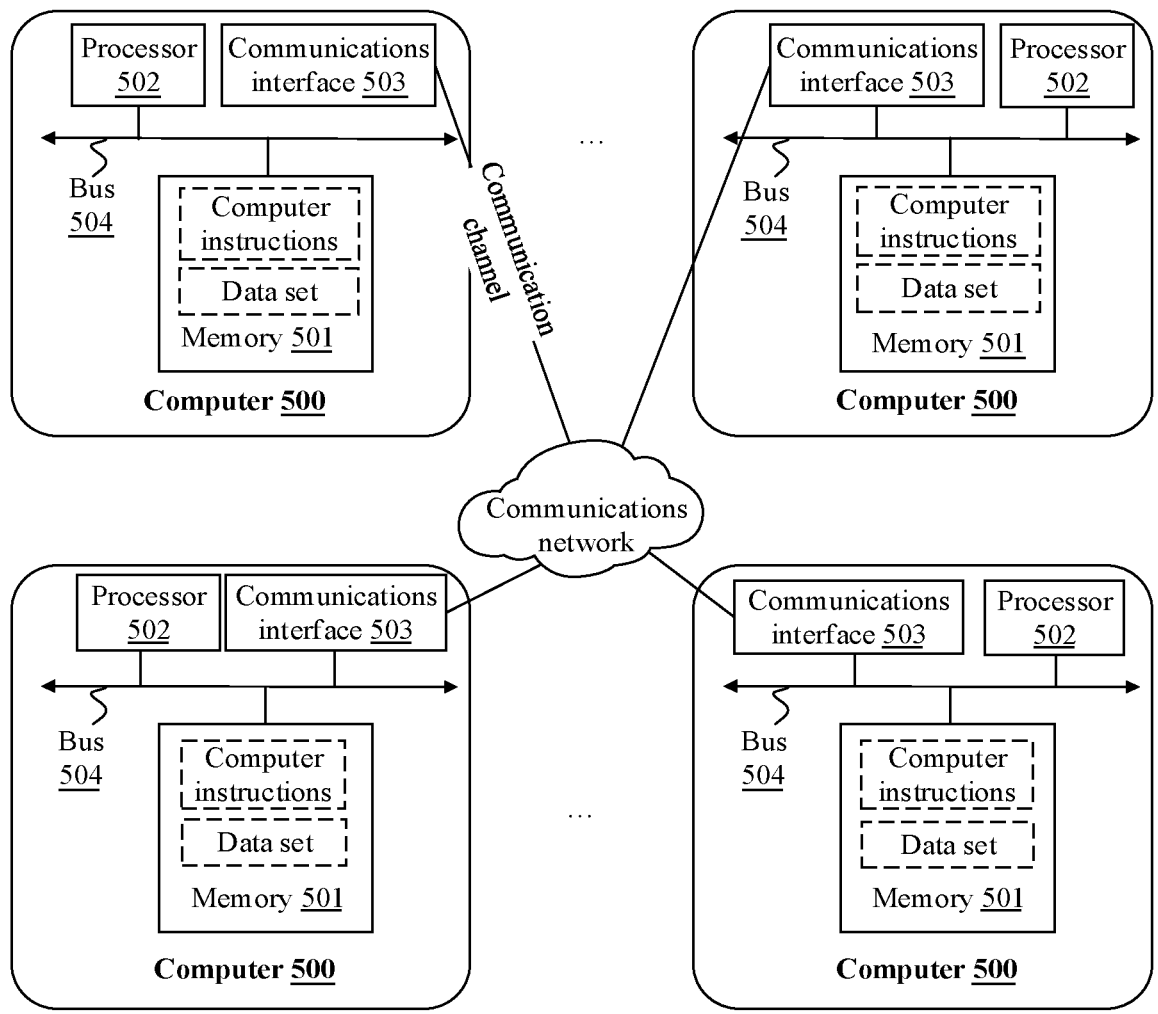
FIG. 5 is a schematic diagram of a structure of a system for lane recognition according to an example embodiment of this disclosure.

When the recognition apparatus is a software apparatus, the recognition apparatus may alternatively be distributed on a plurality of computers in a same environment or different environments. Therefore, this disclosure further provides a system for lane recognition shown in FIG. 5. The system for lane recognition may also be referred to as a computing device for lane recognition, where the computing device includes a plurality of computers 500, and each computer 500 includes a memory 501, a processor 502, a communications interface 503, and a bus 504. The memory 501, the processor 502, and the communications interface 503 are connected to and communicate with each other through the bus 504.

The memory 501 may alternatively be a read-only memory, a static storage device, a dynamic storage device, or a RAM. The memory 501 may store computer instructions, and when the computer instructions stored in the memory 501 are executed by the processor 502, the processor 502 and the communications interface 503 are configured to perform a part of the method for lane recognition. The memory 501 may further store a data set.

The processor 502 may alternatively be a general-purpose central processing unit, an application-specific integrated circuit, a graphics processing unit, or any combination thereof. The processor 502 may include one or more chips. The processor 502 may include an AI accelerator such as a neural network processing unit.

The communications interface 503 uses but is not limited to a transceiver module such as a transceiver, to implement communication between the computer 500 and another device or a communications network. For example, the communications interface 503 may be used to obtain a video.

The bus 504 may include a channel for transmitting information between the components (for example, the memory 501, the processor 502, and the communications interface 503) of the computer 500.

A communication channel is established between the computers 500 through a communications network. Any one or more of an obtaining module 1510, a determining module 1520, and a recognition module 1530 described below may be run on each computer 500. Any computer 500 may be a computer (such as a server) in a cloud data center, a computer in an edge data center, or a terminal computing device.

The following describes an AI model used for the method for lane recognition provided in the embodiments of this disclosure.

When performing the method for lane recognition provided in the embodiments of this disclosure, the recognition apparatus needs to use a trained AI model. The AI model is essentially a mathematical algorithm, and includes a mathematical parameter and a mathematical formula (or a mathematical rule). There are many and various AI models, and a neural network model is one type of AI model. In descriptions of this embodiment of this disclosure, the neural network model is used as an example. It should be understood that, another AI model may be further used to complete a function of the neural network model described in this embodiment of this disclosure. This is not limited in this disclosure.

The neural network model is a type of mathematical calculation model that imitates a structure and function of a biological neural network (that is, the central nervous system of animals). A neural network model may include a plurality of neural network layers with different functions, where each layer includes a parameter and a calculation formula. Based on different calculation formulas or different functions, different layers in the neural network model have different names. For example, a layer for convolution calculation is referred to as a convolution layer, and the convolution layer is often used to extract a feature from an input signal (such as an image). One neural network model may alternatively include a combination of a plurality of existing neural network models. Neural network models with different structures may be used in different scenarios (such as classification and recognition), or have different effects when used in a same scenario. Differences in neural network model structures further include one or more of the following: a difference in a quantity of network layers in a neural network model, a difference in a sequence of various network layers, and a difference in a weight, parameter, or calculation formula of each network layer. In the related field, there are a plurality of different neural network models with relatively high accuracy in an application scenario such as recognition or classification. Some neural network models may be trained by using a specific training set, to independently complete a task, or to complete a task in combination with another neural network model (or another functional module). Some neural network models may alternatively be directly used to independently complete a task, or to complete a task in combination with another neural network model (or another functional module).

In some embodiments of this disclosure, two different trained neural network models need to be used to perform the method for lane recognition. One neural network model that can be used to detect a vehicle in a video after training is referred to as a vehicle detection model. It should be understood that the vehicle detection model in this embodiment of this disclosure may be obtained by training any one of a plurality of neural network models that have been created in the related field. For example, a you only look once (YOLO): unified, real-time object detection model, a single shot multi box detector (SSD) model, a region-based convolutional neural network (RCNN) model, or a fast region-based convolutional neural network (Fast-RCNN) model. A selected neural network model to be trained into the vehicle detection model may be referred to as an initial vehicle detection model.

In some embodiments of this disclosure, the other neural network model that needs to be used to perform the method for lane recognition is a model used to detect a type of a detected vehicle, which is referred to as a vehicle type detection model. The vehicle type detection model may alternatively be obtained by training any one of some existing neural network models in the related field, for example, a convolutional neural network (CNN) model, a residual network (Resnet) model, a dense network (Densenet) model, and a visual geometry group network (VGGnet) model. A selected neural network model to be trained into the vehicle type detection model may be referred to as an initial vehicle type detection model. It should be understood that a neural network model that can implement vehicle detection and vehicle type detection and that is to be developed in the related field in the future may also be used as the vehicle detection model and the vehicle type detection model in the embodiments of this disclosure. This is not limited in this disclosure.

The vehicle detection model and the vehicle type detection model may be trained by a training apparatus before being used for lane recognition. The training apparatus trains the initial vehicle detection model and the initial vehicle type detection model respectively by using different training sets. The vehicle detection model and the vehicle type detection model that are trained by the training apparatus may be deployed in the recognition apparatus, and are used by the recognition apparatus to determine a vehicle trajectory and a type of a vehicle.

Figure 6:
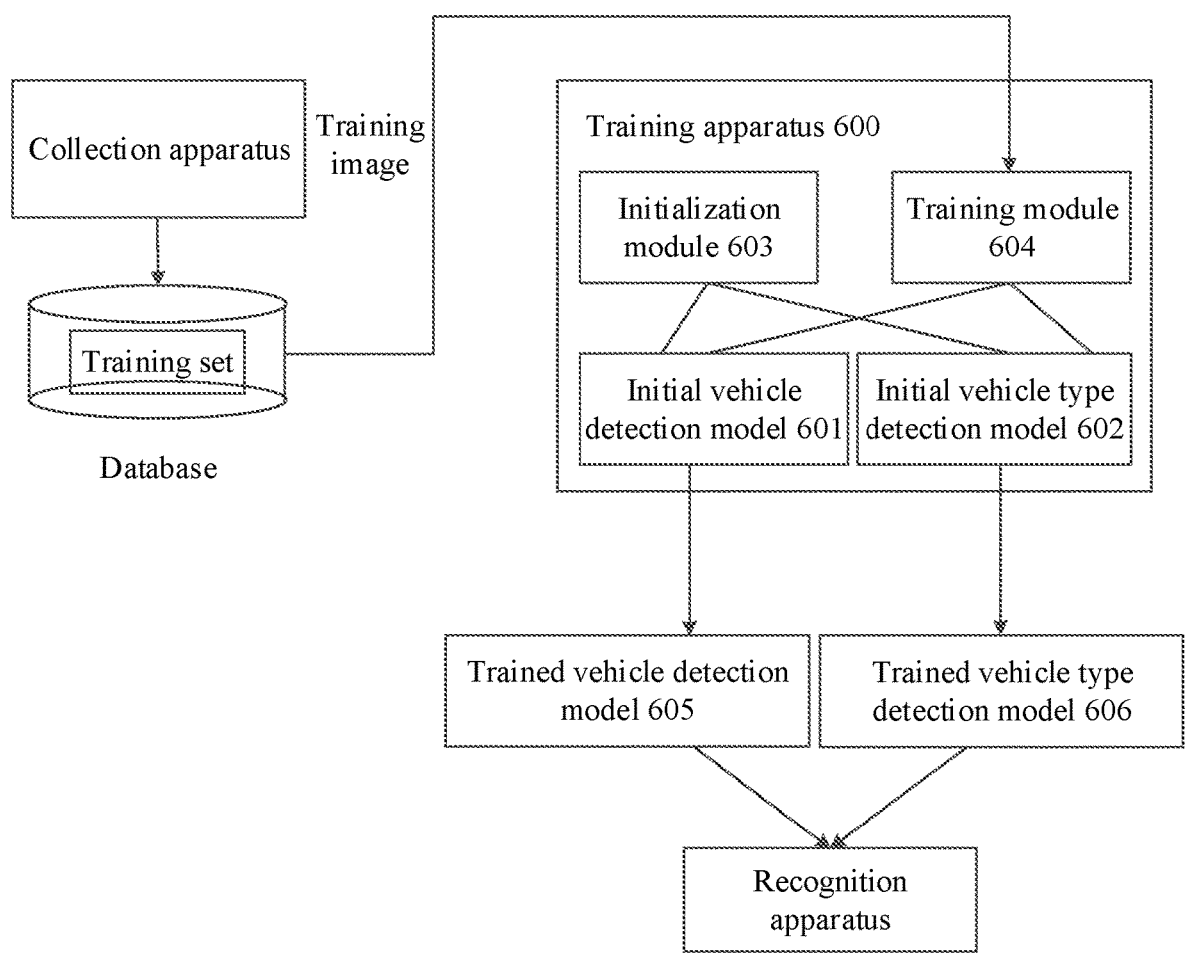
FIG. 6 is a schematic diagram of a structure of a training apparatus and a recognition apparatus according to an example embodiment of this disclosure.

FIG. 6 is a schematic diagram of a structure of a training apparatus 600 and a recognition apparatus. The following describes structures and functions of the training apparatus 600 and the recognition apparatus with reference to FIG. 6. It should be understood that division of the structures and division into functional modules of the training apparatus 600 and the recognition apparatus are an example in the embodiments of this disclosure. Specific division is not limited in this disclosure.

The training apparatus 600 is configured to separately train an initial vehicle detection model 601 and an initial vehicle type detection model 602, where two training sets are required for training the initial vehicle detection model 601 and the initial vehicle type detection model 602, which are respectively referred to as a vehicle detection training set and a vehicle type detection training set. The vehicle detection training set and the vehicle type detection training set that are obtained by a collection apparatus are stored in a database. The collection apparatus may collect a plurality of training videos or training images, and the collected plurality of training videos or training images are processed and marked manually or by the collection apparatus to build a training set. When a plurality of training videos is collected by the collection apparatus, the collection apparatus uses video frames of the training videos as training images, and further processes and marks the training images to build a training set. When the training apparatus 600 starts to train the initial vehicle detection model 601, an initialization module 603 first initializes a parameter at each layer in the initial vehicle detection model 601 (that is, assigns an initial value to each parameter). Further, the training module 602 reads training images in the vehicle detection training set in the database and trains the initial vehicle detection model 601, until a loss function in the initial vehicle detection model 601 converges and a loss function value is less than a specific threshold, or all the training images in the vehicle detection training set are used for training. Then, training of the initial vehicle detection model 601 is completed, and a trained vehicle detection model 605 is obtained. Similarly, when the training apparatus 600 starts to train the initial vehicle type detection model 602, an initialization module 603 first initializes a parameter at each layer in the initial vehicle type detection model 602 (that is, assigns an initial value to each parameter). Further, the training module 604 reads training images in the vehicle type detection training set in the database and trains the initial vehicle type detection model 602, until a loss function in the initial vehicle type detection model 602 converges and a loss function value is less than a specific threshold, or all the training images in the vehicle type detection training set are used for training. Then, training of the initial vehicle type detection model 602 is completed, and a trained vehicle type detection model 606 is obtained.

It should be noted that, the vehicle detection model 605 and the vehicle type detection model 606 may alternatively be obtained by two training apparatuses through separate training. The vehicle detection model 605 and/or the vehicle type detection model 606 may alternatively not need to be trained by the training apparatus 600. For example, the vehicle detection model 605 and/or the vehicle type detection model 606 use a neural network model that has been trained by a third party and that has relatively high accuracy for vehicle detection and/or vehicle type detection.

In some embodiments of this disclosure, the collection apparatus may not need to collect a training image or a training video, and a vehicle detection training set and/or a vehicle type detection training set may alternatively not need to be built. For example, the vehicle detection training set and/or the vehicle type detection training set are/is directly obtained from a third party. In addition, it should be noted that, in this disclosure, a training image in the vehicle detection training set may have same content as but different labels from a training image in the vehicle type detection training set. For example, the collection apparatus collects 10000 images that include vehicles running on various roads. When the vehicle detection training set is built, the vehicles in the 10000 images are marked out with bounding boxes, and the 10000 training images with marks of the bounding boxes form the vehicle detection training set. When the vehicle type detection training set is built, the vehicles in the 10000 images are marked out with bounding boxes, and each bounding box correspondingly marks a vehicle type (such as a vehicle model or a vehicle brand). The 10000 training images with marks of the bounding boxes and types form the vehicle type detection training set.

It should be noted that, in an embodiment of this disclosure, the recognition apparatus may alternatively use only one trained neural network model which may be referred to as a detection and recognition model when performing lane recognition. The detection and recognition model is a model that includes all functions of the vehicle detection model 605 and the vehicle type detection model 606. The detection and recognition model can detect a vehicle position and can also recognize a vehicle, and then detect a type of the recognized vehicle. A training principle of the detection and recognition model is the same as a training principle of the initial vehicle detection model 601 and the initial vehicle type detection model 602. Details are not described herein again.

The vehicle detection model 605 and the vehicle type detection model 606 that are trained by the training apparatus 600 may be respectively used to perform vehicle detection and vehicle type detection on a video frame of a video recorded by a monitoring device. In an embodiment of this disclosure, as shown in FIG. 6, the trained vehicle detection model 605 and the trained vehicle type detection model 606 are deployed on the recognition apparatus.

Figure 7:
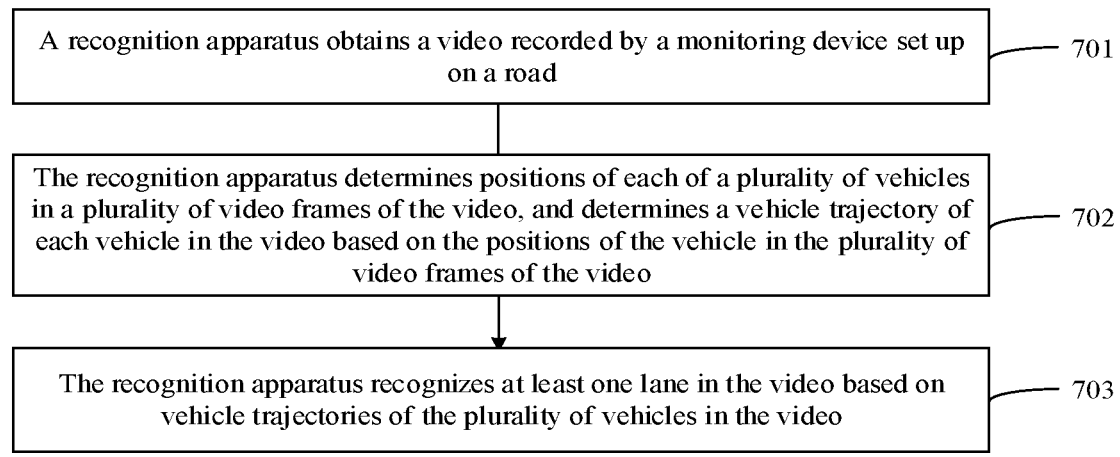
FIG. 7 is a schematic flowchart of a method for lane recognition according to an example embodiment of this disclosure.

The following describes, with reference to FIG. 7, a method for recognizing a lane in a video provided in an embodiment of this disclosure. The method may be performed by a recognition apparatus. As shown in FIG. 7, a processing procedure of the method is as follows:

Step 701: The recognition apparatus obtains a video recorded by a monitoring device set up on a road.

The video shows vehicles on the road that pass a shooting area of the monitoring device.

In this embodiment, a communication connection is established between the recognition apparatus and a monitoring device. When a video is recorded, the monitoring device transmits the video to the recognition apparatus in real time, or the monitoring device periodically sends the recorded video to the recognition apparatus. In this way, the recognition apparatus may obtain the video.

Step 702: The recognition apparatus determines positions of each of a plurality of vehicles in a plurality of video frames of the video, and determines a vehicle trajectory of each vehicle in the video based on the positions of the vehicle in the plurality of video frames of the video.

In this embodiment, the recognition apparatus may input the obtained video into the foregoing vehicle detection model 605, and the vehicle detection model 605 outputs a position of a bounding box marking a vehicle in each video frame of the video. For any vehicle in the video, the recognition apparatus determines a position of a bounding box marking the vehicle, as a position of the vehicle in the video. For a position of any bounding box, if the bounding box is a rectangular box, the position may be an upper-left-corner position coordinate and a lower-right-corner pixel coordinate that are of the bounding box in a video frame, or the position may be a pixel coordinate of a central point of the bounding box in a video frame.

Then, the recognition apparatus may input a position of a bounding box included in each video frame into a preset multi-object tracking algorithm, and after the position of the bounding box is obtained for the multi-object tracking algorithm, a distance between two bounding boxes in two adjacent video frames may be calculated. Based on the calculated distance, the bounding boxes in the two video frames are associated, and a plurality of groups of associated bounding boxes are obtained. For example, a video frame 1 and a video frame 2 are two adjacent video frames. The video frame 1 includes three bounding boxes, and the video frame 2 includes three bounding boxes. For any bounding box in the video frame 1, distances between the bounding box and the three bounding boxes in the video frame 2 may be calculated, and two bounding boxes with a shortest distance in the three distances are determined as associated bounding boxes. Further, a distance between bounding boxes may be represented by using a distance between central positions of the bounding boxes.

Optionally, the recognition apparatus may further input attribute information of a vehicle in the bounding box included in each video frame (where the attribute information of the vehicle may include a vehicle model, a license plate number, and the like) into a preset multi-object tracking algorithm. The attribute information of the vehicle may be obtained through detection by the vehicle detection model 605, or may be obtained through detection by another neural network model specially used to detect an attribute of a vehicle. After the attribute information of the vehicle in the bounding box is obtained for the multi-object tracking algorithm, a similarity between attribute information of vehicles in two bounding boxes in two adjacent video frames may be calculated. Based on the calculated similarity, the bounding boxes in the two video frames are associated, and a plurality of groups of associated bounding boxes are obtained. For example, the video frame 1 and the video frame 2 are two adjacent video frames, the video frame 1 includes three bounding boxes, and the video frame 2 includes three bounding boxes. For any bounding box in the video frame 1, similarities between attribute information of a vehicle in the bounding box and attribute information of vehicles in the three bounding boxes in the video frame 2 may be calculated, and two bounding boxes with a highest similarity in the three similarities are determined as associated bounding boxes. Further, a manner of calculating a similarity between attribute information of vehicles in any two bounding boxes may be determining a similarity between each type of attribute information of the vehicles (for example, when the attribute information of the vehicles is about a license plate number, and the license plate numbers of the vehicles in the two bounding boxes are the same, for this type of attribute information about a license plate number, the similarity between the two bounding boxes is 100%), and weighting similarities between different types of attribute information to obtain the similarity between the attribute information of the vehicles in the bounding boxes.

Each group of associated bounding boxes may be considered as a plurality of bounding boxes of a same vehicle in a plurality of video frames. In this way, the recognition apparatus may perform fitting on central positions of each group of associated bounding boxes based on a time sequence of corresponding video frames, to obtain a plurality of vehicle trajectories. In this way, the recognition apparatus may obtain a vehicle trajectory of each vehicle in a video.

It should be noted herein that the multi-object tracking algorithm may be stored in the recognition apparatus, and the stored multi-object tracking algorithm is obtained when the recognition apparatus determines a vehicle trajectory of a vehicle in a video, or the multi-object tracking algorithm is stored in another device, and the multi-object tracking algorithm is invoked from the other device when the recognition apparatus determines a vehicle trajectory of a vehicle in a video. The multi-object tracking algorithm may be any object tracking algorithm that can associate bounding boxes in a plurality of video frames, for example, a Kalman filter algorithm. Further, after a position of a bounding box in a video or attribute information of a vehicle included in a video is input into the multi-object tracking algorithm, the multi-object tracking algorithm outputs associated bounding boxes.

It should be noted that the vehicle trajectory determined in step 702 is a position change of the vehicle in each video frame of the video. To be specific, a pixel coordinate sequence is used to represent the vehicle trajectory of the vehicle in the video, rather than a position change on an actual road.

Step 703: The recognition apparatus recognizes at least one lane in the video based on vehicle trajectories of the plurality of vehicles in the video.

In this embodiment, the recognition apparatus may recognize, one by one, a lane to which each vehicle trajectory belongs in the video, and determine the at least one lane in the video based on the lane to which each vehicle trajectory belongs in the video. Details about how to recognize the lane to which the vehicle trajectory belongs in the video are provided in the following descriptions.

Alternatively, in some other embodiments, the lane in the video may alternatively be determined in a manner of vehicle trajectory aggregation. First, a preset quantity is obtained, where the preset quantity is an actual quantity of lanes in the video, and the preset quantity may be manually input into the recognition apparatus in advance. The recognition apparatus may cluster the vehicle trajectories of the plurality of vehicles in the video into a cluster of vehicle trajectories with the preset quantity by using an aggregation processing algorithm, and determine a central line of each cluster of vehicle trajectories. The recognition apparatus determines an area between two adjacent central lines as one lane. In this case, a rightmost lane is an area between a right boundary of a to-be-recognized area (described below) and a central line adjacent to the right boundary, and a leftmost lane is an area between a left boundary of the to-be-recognized area and a central line adjacent to the left boundary. Further, the left boundary of the to-be-recognized area is a line that belongs to the to-be-recognized area, is nearest to a leftmost side of the to-be-recognized area, and is parallel to the central line adjacent to the left boundary. The right boundary of the to-be-recognized area is a line that belongs to the to-be-recognized area, is nearest to a rightmost side of the to-be-recognized area, and is parallel to the central line adjacent to the left boundary.

It should be noted that, the lane determined in step 703 is a lane in the video, and the lane is represented by using pixel coordinates, and is not convertible to an actual lane on a road.

Optionally, in some cases, the video frame of the video includes not only a to-be-recognized lane, but may further include another lane. Therefore, the to-be-recognized area in the video needs to be determined, and a lane in the to-be-recognized area is the to-be-recognized lane. Further, there may be a plurality of methods for the recognition apparatus to determine the to-be-recognized area in the video, and several feasible manners are provided as follows:

Manner 1: The recognition apparatus obtains a lane recognition line in the video, and determines the to-be-recognized area based on the lane recognition line. The lane recognition line is a marking line used to determine the to-be-recognized area in the video.

Figure 8:
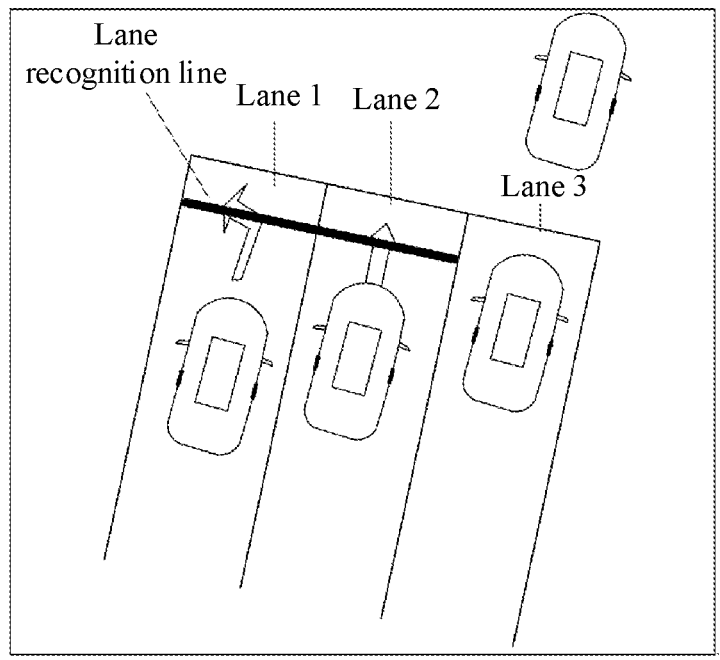
FIG. 8 is a schematic diagram of a lane recognition line according to an example embodiment of this disclosure.

In some embodiments, before a lane is recognized, the recognition apparatus provides a lane recognition line setting interface, and a staff member may trigger displaying of the lane recognition line setting interface. In the setting interface, the lane recognition line may be marked in a video frame of the video by the staff member, where the lane recognition line may cross with a to-be-detected lane. For example, as shown in FIG. 8, a staff member marks out a lane recognition line in a video frame, and the lane recognition line indicates that only a lane 1 and a lane 2 are detected, and a lane 3 is not detected. Then, the recognition apparatus may store information about the lane recognition line in the video, and subsequently, when lane recognition is performed, the recognition apparatus may obtain the lane recognition line in the video.

The recognition apparatus may determine a straight line that is perpendicular to the lane recognition line and that crosses with a left-side end point of the lane recognition line as a left boundary of a to-be-recognized area, and the recognition apparatus may determine a straight line that is perpendicular to the lane recognition line and that crosses with a right-side end point of the lane recognition line as a right boundary of the to-be-recognized area. It should be noted herein that a left side and a right side of the lane recognition line are described based on a running direction of the vehicle. In this way, the recognition apparatus may determine the to-be-recognized area.

Subsequently, the recognition apparatus may obtain a plurality of vehicle trajectories in the to-be-recognized area based on position information of the to-be-recognized area in the video frame of the video.

Manner 2: The recognition apparatus may determine a line segment, in the video frame of the video, that is at a preset distance from a bottom part of the video frame and that is parallel to the bottom part of the video frame as the lane recognition line. The to-be-recognized area is determined based on the lane recognition line.

The preset distance can be pre-configured. For example, the preset distance is ¼ of a height of the video frame.

In this embodiment, after obtaining the video, the recognition apparatus may determine a line segment, in the video frame of the video, that is at a preset distance from a bottom part of the video frame and that is parallel to the bottom part of the video frame as a lane recognition line, where a length of the line segment is equal to a length of the video frame. The recognition apparatus may then use the lane recognition line to determine the to-be-recognized area (where a determining manner is the above described manner 1, and details are not described herein again).

Clearly, the length of the line segment parallel to the bottom part of the video frame may be not equal to the length of the video frame but a preset length, where the preset length is less than the length of the video frame.

It should be noted herein that a process in which the recognition apparatus determines the to-be-recognized area is optional. When the to-be-recognized area has been specified in the video, the recognition apparatus may not perform processing in the process.

The following describes a more specific procedure of step 703.

Figure 9:
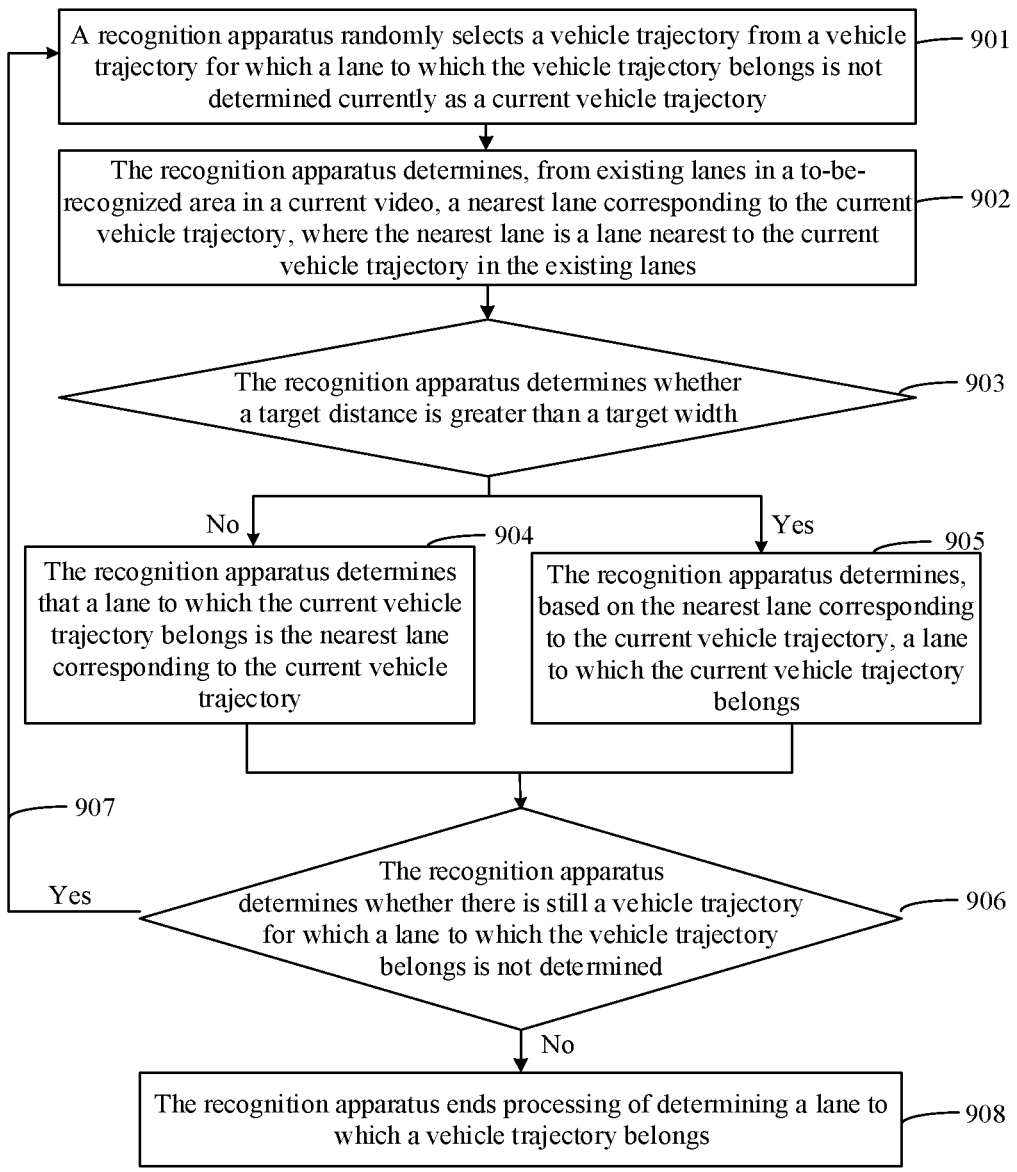
FIG. 9 is a schematic flowchart of determining a lane to which each vehicle trajectory belongs according to an example embodiment of this disclosure.

In step 703, as shown in FIG. 9, the recognition apparatus may recognize the lane in the video according to the following procedure:

Step 901: The recognition apparatus randomly selects a vehicle trajectory (or a vehicle trajectory of a first vehicle) from a vehicle trajectory for which a lane to which the vehicle trajectory belongs is not determined currently as a current vehicle trajectory.

Step 902: The recognition apparatus determines, from existing lanes in a to-be-recognized area in a current video, a nearest lane corresponding to the current vehicle trajectory, where the nearest lane is a lane nearest to the current vehicle trajectory in the existing lanes.

In this embodiment, the recognition apparatus determines a line formed by central positions between a left lane line and a right lane line of a current existing lane (that is, an existing lane in the to-be-recognized area in the current video), where the line may be referred to as a central line. The recognition apparatus determines coordinates of an intersection point of the current vehicle trajectory and the lane recognition line, and then determines a distance (where the distance is a pixel distance) between the intersection point and the central line of the current existing lane. In specific calculation, the recognition apparatus determines coordinates of an intersection point of the central line of the current existing lane and the lane recognition line, and then calculates a distance between the two intersection points (where one intersection point is the intersection point of the current vehicle trajectory and the lane recognition line, and the other intersection point is the intersection point of the central line and the lane recognition line), that is, a distance between the current vehicle trajectory and the current existing lane. The calculation manner herein is merely an example, and clearly another manner may alternatively be used. The recognition apparatus determines a lane with a shortest distance in determined distances as the nearest lane corresponding to the current vehicle trajectory.

Step 903: The recognition apparatus determines whether a target distance is greater than a target width, where the target distance is a distance between the current vehicle trajectory and the nearest lane corresponding to the current vehicle trajectory, and the target width is a width of a bounding box marking a vehicle to which the current vehicle trajectory belongs.

In this embodiment, the recognition apparatus determines the width (where the width is a pixel width) of the bounding box marking the vehicle to which the current vehicle trajectory belongs, and determines whether the target distance is greater than the target width.

Step 904: If the target distance is not greater than the target width, the recognition apparatus determines that a lane to which the current vehicle trajectory belongs is the nearest lane corresponding to the current vehicle trajectory.

Step 905: If the target distance is greater than the target width, the recognition apparatus determines, based on the nearest lane corresponding to the current vehicle trajectory, a lane to which the current vehicle trajectory belongs.

In this embodiment, the recognition apparatus randomly selects a vehicle trajectory in the nearest lane corresponding to the current vehicle trajectory, and determines a central line of the vehicle trajectory and the current vehicle trajectory. Alternatively, the recognition apparatus aggregates vehicle trajectories included in the nearest lane corresponding to the current vehicle trajectory, to obtain an aggregated vehicle trajectory, and determines a central line of the aggregated vehicle trajectory and the current vehicle trajectory. In the two cases, there are a plurality of vehicle trajectories included in the nearest lane. If the nearest lane includes only one vehicle trajectory, the vehicle trajectory and the current vehicle trajectory are directly used to determine the central line. Further, a central line of two vehicle trajectories (a vehicle trajectory A and a vehicle trajectory B) may be determined in a plurality of manners. The following provides but is not limited to the following three calculation manners:

Manner 1: The recognition apparatus determines an intersection point of the vehicle trajectory A and the lane recognition line, and an intersection point of the vehicle trajectory B and the lane recognition line, and obtains a central point of the two intersection points in a direction of the lane recognition line. A straight line that includes the central point and that is perpendicular to the lane recognition line is determined as a central line of the vehicle trajectory A and the vehicle trajectory B. The manner 1 may be applied to a straight-through lane.

Manner 2: The recognition apparatus moves the lane recognition line along the vehicle trajectory A and the vehicle trajectory B with an equal distance, and after each movement, determines intersection points of the vehicle trajectory A and the vehicle trajectory B respectively and the lane recognition line, to determine a central point of the two intersection points. The recognition apparatus connects all central points to obtain the central line of the vehicle trajectory A and the vehicle trajectory B.

Manner 3: The recognition apparatus performs fitting on the vehicle trajectory A and the vehicle trajectory B to obtain a trajectory, where the trajectory is the central line of the vehicle trajectory A and the vehicle trajectory B.

Then, the recognition apparatus determines a position relationship between the vehicle trajectory in the nearest lane and the current vehicle trajectory. If the vehicle trajectory in the nearest lane is on a left side of the current vehicle trajectory, the recognition apparatus determines the foregoing central line as a right lane line of the nearest lane, and the recognition apparatus determines the foregoing central line as a left lane line of a lane to which the current vehicle trajectory belongs, and determines a lane line adjacent to a right side of the lane as a right lane line of the lane to which the current vehicle trajectory belongs. If the vehicle trajectory in the nearest lane is on a right side of the current vehicle trajectory, a result is opposite to the foregoing result. This is equivalent to newly adding the lane to which the current vehicle trajectory belongs. It should be noted herein that, when the central line of the nearest lane is determined, the left lane line and a right lane line of the nearest lane are already used, and a reason for further determining the right lane line of the nearest lane herein is that the right lane line of the nearest lane is originally used as the right boundary of the to-be-recognized area but not a true lane line of the nearest lane.

Step 906: The recognition apparatus determines whether there is still a vehicle trajectory for which a lane to which the vehicle trajectory belongs is not determined.

Step 907: If there is the vehicle trajectory for which a lane to which the vehicle trajectory belongs is not determined, return to step 901.

Step 908: If there is no vehicle trajectory for which a lane to which the vehicle trajectory belongs is not determined, the recognition apparatus ends processing of determining a lane to which a vehicle trajectory belongs.

After determining a lane to which each vehicle trajectory in the video belongs, the recognition apparatus may determine the determined lane as the lane in the video. For example, there are 50 vehicle trajectories in the video in total, where 15 vehicle trajectories belong to a first lane, 20 vehicle trajectories belong to a second lane, and 15 vehicle trajectories belong to a third lane. It may be determined that lanes in the video are the first lane, the second lane, and the third lane.

Figure 10:
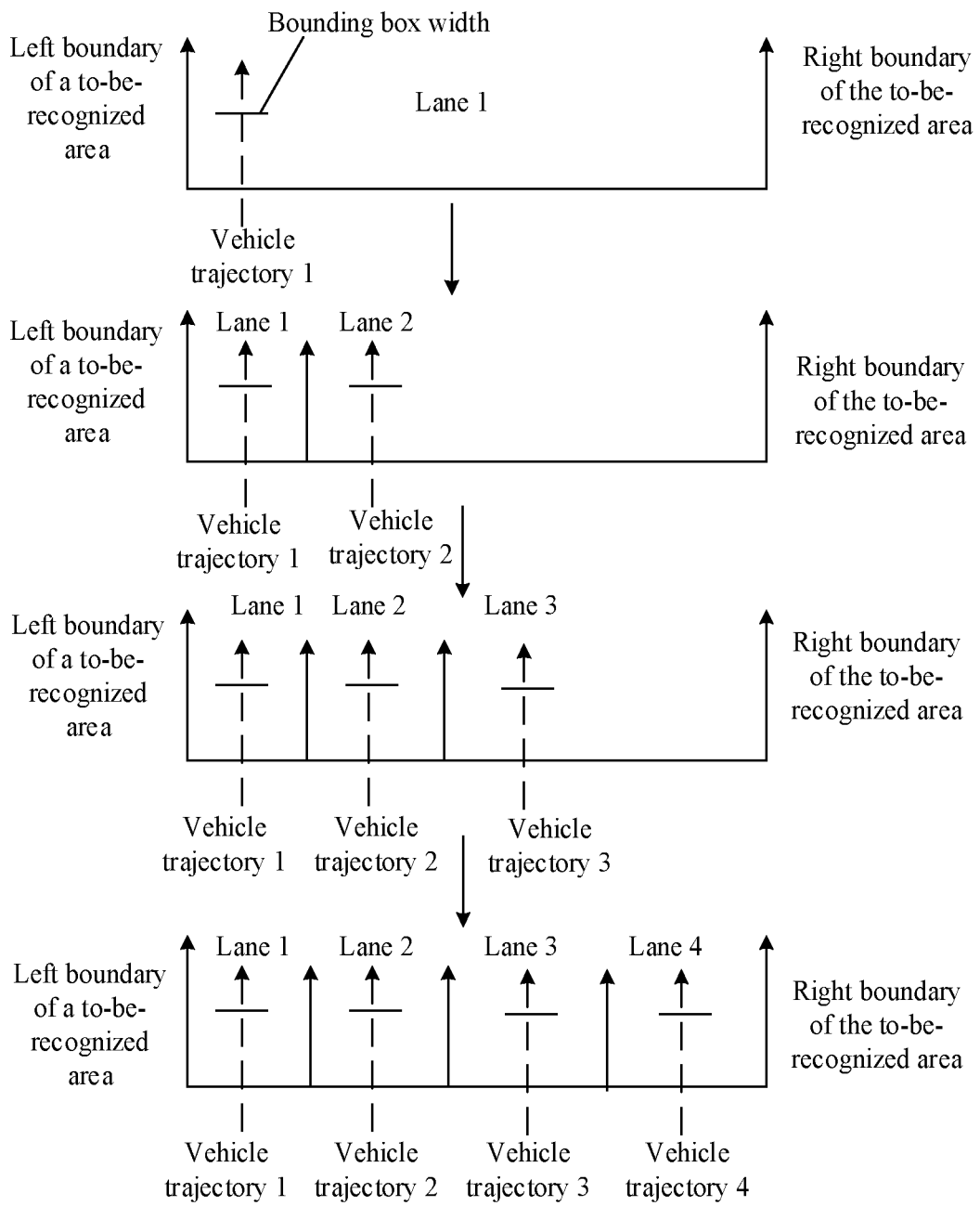
FIG. 10 is a schematic diagram of determining a lane to which each vehicle trajectory belongs according to an example embodiment of this disclosure.

For ease of understanding, an embodiment of this disclosure further provides a visual process of determining a lane shown in FIG. 10. A vehicle trajectory 1 is the first vehicle trajectory selected in step 901, and currently, there is only a lane 1 by default. A vehicle trajectory 2 is the second vehicle trajectory selected in step 901, and a lane 2 is added. A vehicle trajectory 3 is the third vehicle trajectory selected in step 901, and a lane 3 is added. A vehicle trajectory 4 is the fourth vehicle trajectory selected in step 901, and a lane 4 is added.

It should be noted that, in the procedure shown in FIG. 9, when the recognition apparatus uses a vehicle trajectory randomly selected for the first time from the vehicle trajectory currently without a determined lane to which the vehicle trajectory belongs as the current vehicle trajectory, the to-be-recognized area has only one lane by default. Lane lines of the lane are the left boundary of the to-be-recognized area and the right boundary of the to-be-recognized area. The lane may be directly determined as the lane to which the current vehicle trajectory belongs, and processing in step 902 to step 908 is not performed. Then, the recognition apparatus performs the processing in step 901 to step 908 again, until a lane to which a last vehicle trajectory belongs is determined, and the recognition apparatus may re-determine a lane to which the vehicle trajectory randomly selected for the first time belongs based on the processing in step 902 to step 908.

It should be further noted herein that a vehicle generally runs within an area near the middle of a lane. When a distance between a vehicle trajectory and a nearest lane is less than or equal to a width of a bounding box, it indicates that a vehicle in the bounding box runs on the nearest lane with a high probability. When a distance between a vehicle trajectory and a nearest lane is greater than a width of a bounding box, it indicates that a vehicle in the bounding box does not run on the nearest lane with a high probability.

In addition, in step 904, the target distance is not greater than the target width, and it indicates that the current vehicle trajectory belongs to a nearest lane corresponding to the current vehicle trajectory. The current vehicle trajectory may be added to a historical trajectory list of the nearest lanes for subsequent lane correction processing. Herein, a historical trajectory list of each lane may store a specific quantity of vehicle trajectories within a current time period, for example, a specific quantity of 50.

Optionally, after the recognition apparatus performs step 703 to determine the lane in the video, step 704 may be further included.

Step 704: Whether the determined lane is correct is determined, and if the determined lane is incorrect, the recognition apparatus corrects the lane.

Corresponding specific correction processing may be as follows.

When a quantity of determined lanes is not equal to the preset quantity, the recognition apparatus obtains, based on the preset quantity and a vehicle trajectory of each vehicle in the video, a corrected lane in the video.

In this embodiment, the recognition apparatus may obtain the preset quantity, where the preset quantity may be input by a staff member in advance, and the recognition apparatus stores the preset quantity. The preset quantity is an actual quantity of detected lanes in the video.

The recognition apparatus may compare the quantity of lanes determined in step 703 with the preset quantity. If the quantity of lanes is not equal to the preset quantity, it indicates that the lane determined in step 703 is inaccurate. The recognition apparatus may perform correction processing on the lane in the to-be-recognized area in a plurality of manners, and three feasible manners are provided as follows:

Manner 1: The recognition apparatus obtains a lane recognition line, to determine an intersection point of each vehicle trajectory in the vehicle trajectories of the plurality of vehicles in the video and the lane recognition line. Then, the recognition apparatus inputs coordinates of all intersection points and the preset quantity into the aggregation processing algorithm, and an output is the preset quantity of intersection points. The recognition apparatus determines a central point of each intersection point, and determines a straight line that is in straight lines in which each central point is located and that is perpendicular to the lane recognition line as a central line of a lane. Then, a central line of two adjacent central lines is determined as a lane line of a lane. Herein, for a lane to which a left-side central line belongs, the central line is a right lane line of the lane, and for a lane to which a right-side central line belongs, the central line is a left lane line of the lane. It should be noted herein that, for a leftmost lane, the left lane line of the lane is a straight line that is perpendicular to the lane recognition line and that intersects a leftmost side of the lane recognition line (or may be the left boundary of the to-be-recognized area), and for a rightmost lane, the right lane line of the lane is a straight line that is perpendicular to the lane recognition line and that intersects a rightmost side of the lane recognition line (or may be the right boundary of the to-be-recognized area). The aggregation processing algorithm may be the K-means (K-means) clustering algorithm, or the like. In this manner, all corrected lanes in the video can be determined.

Figure 11:
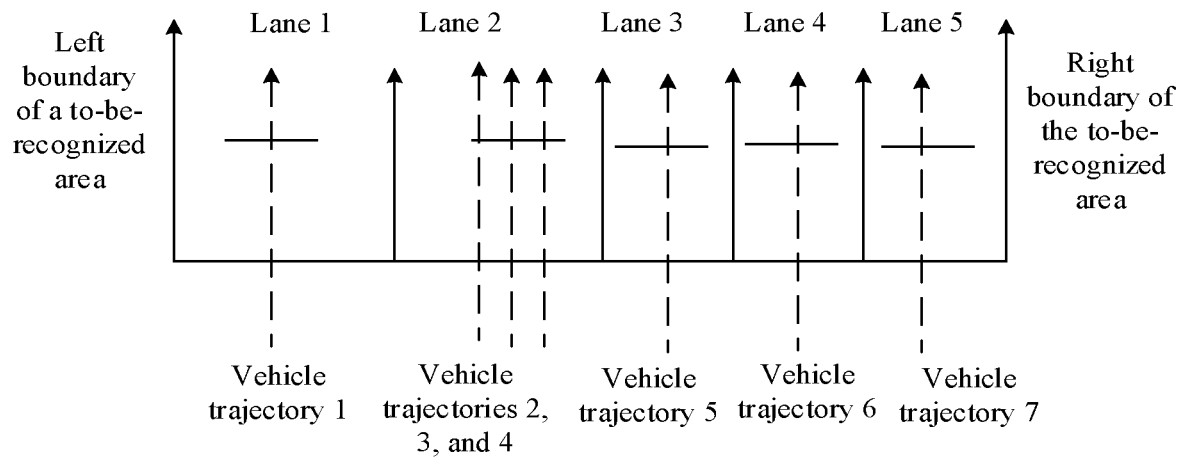
FIG. 11 is a schematic diagram of a to-be-corrected lane according to an example embodiment of this disclosure.
Figure 12:
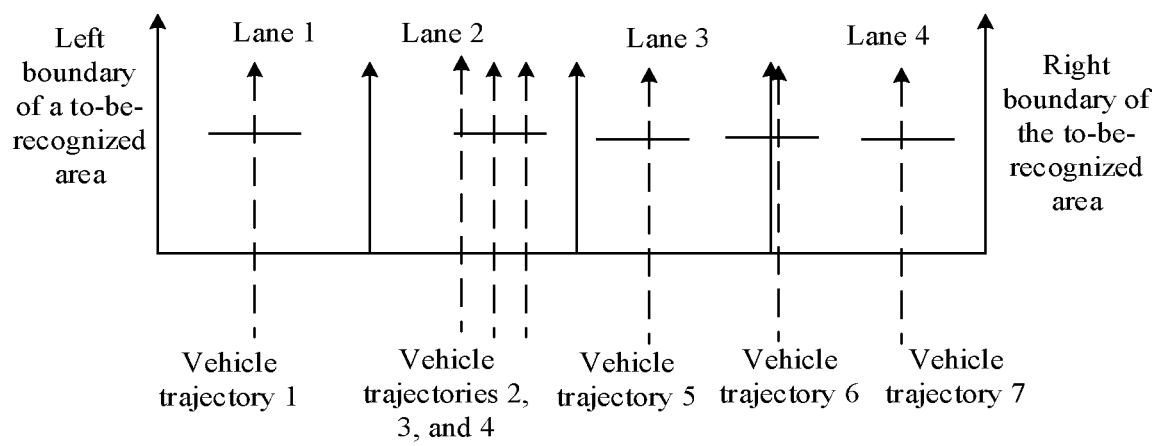
FIG. 12 is a schematic diagram of a corrected lane according to an example embodiment of this disclosure.

For example, as shown in FIG. 11, a quantity of recognized lanes in step 703 is 5, but a known target quantity is 4. Before lane correction is performed, a vehicle trajectory 1 belongs to a lane 1, vehicle trajectories 2, 3, and 4 belong to a lane 2, a vehicle trajectory 5 belongs to a lane 3, a vehicle trajectory 6 belongs to a lane 4, and a vehicle trajectory 7 belongs to a lane 5. After the lane correction, FIG. 12 shows that the vehicle trajectory 1 belongs to the lane 1, the vehicle trajectories 2, 3, and 4 belong to the lane 2, the vehicle trajectory 5 belongs to the lane 3, and the vehicle trajectories 6 and 7 belong to the lane 4. It should be understood that FIG. 11 and FIG. 12 show only some vehicle trajectories.

Manner 2: The recognition apparatus inputs the vehicle trajectories of the plurality of vehicles in the video and the preset quantity into an aggregation processing algorithm, and an output is vehicle trajectories of the preset quantity obtained by aggregating the vehicle trajectories of the plurality of vehicles in the video. The recognition apparatus determines a central line of any two adjacent vehicle trajectories (where the method for determining a central line of two vehicle trajectories is described above and is not described herein again), and determines the central line of the two adjacent vehicle trajectories as a lane line of a lane. Herein, for a lane to which a left vehicle trajectory belongs, the central line is a right lane line of the lane, and for a lane to which a right vehicle trajectory belongs, the central line is a left lane line of the lane. It should be noted herein that the aggregation processing algorithm may be any algorithm, for example, the least square method, that can be used for curve fitting.

Manner 3: The recognition apparatus obtains the corrected lane in the video based on the vehicle trajectories of the plurality of vehicles in the video, and the determined lane and the clustering processing algorithm in step 703.

In this embodiment, the recognition apparatus obtains a lane recognition line, to determine an intersection point of each vehicle trajectory in the vehicle trajectories of the plurality of vehicles in the video and the lane recognition line. Then, the recognition apparatus inputs coordinates of all intersection points and the preset quantity into the aggregation processing algorithm, and an output is the preset quantity of intersection points. The recognition apparatus determines a central point of each intersection point and determines a midpoint of a connection line of central points of two adjacent intersection points.

For each determined midpoint, the recognition apparatus determines a lane line of a lane that is nearest to the midpoint and that is in the lane determined in step 703, and determines a line that passes through the midpoint and is parallel to the lane line as a new lane line corresponding to the midpoint. Based on this manner, a new lane line corresponding to each midpoint may be determined. The recognition apparatus determines an area between adjacent new lane lines as a lane. It should be noted herein that, for a leftmost lane or a rightmost lane in the to-be-recognized area, the recognition apparatus determines an area between the left boundary of the to-be-recognized area and an adjacent new lane line as a lane, and the recognition apparatus determines an area between the right boundary of the to-be-recognized area and an adjacent new lane line as a lane. In this way, the recognition apparatus can update the lane determined in step 703.

Figure 13:
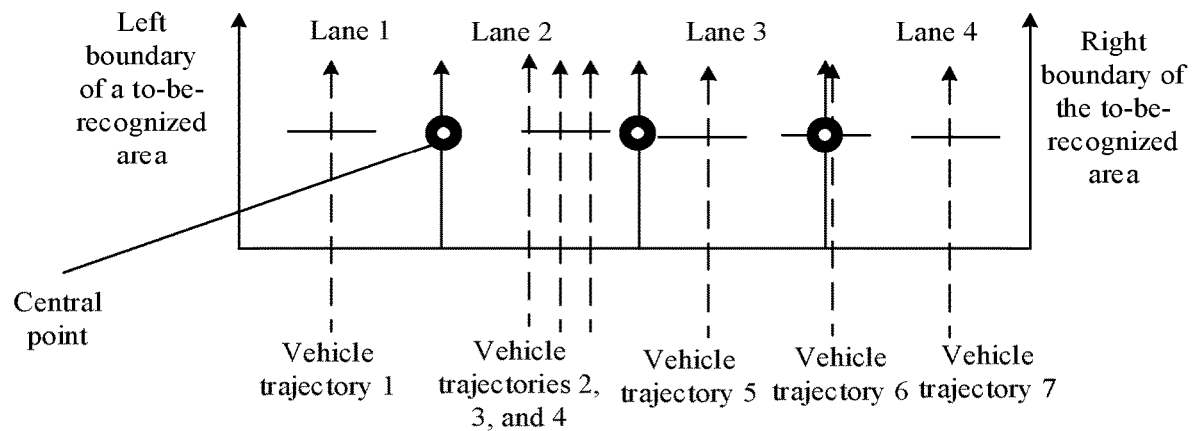
FIG. 13 is a schematic diagram of a corrected lane according to an example embodiment of this disclosure.

For example, as shown in FIG. 11, a target quantity is 4, but a quantity of recognized lanes in step 703 is 5. Before lane correction is performed, a vehicle trajectory 1 belongs to a lane 1, vehicle trajectories 2, 3, and 4 belong to a lane 2, a vehicle trajectory 5 belongs to a lane 3, a vehicle trajectory 6 belongs to a lane 4, and a vehicle trajectory 7 belongs to a lane 5. Three midpoints are determined through calculation, and the recognition apparatus determines a lane line nearest to each midpoint, and then determines a line that passes through each midpoint and is parallel to the nearest lane line as a new lane line. Then, the recognition apparatus successively combines, in pairs, the left boundary, the new lane line, and the right boundary in the to-be-recognized area to form lane lines of a lane, to obtain a lane 1, a lane 2, a lane 3, and a lane 4 after updating, as shown in FIG. 13. It should be understood that FIG. 13 shows only some vehicle trajectories.

In this way, when a lane determined in step 703 is inaccurate, the lane can be corrected, to obtain an accurate lane. In the manner 1 and the manner 2, a re-determined lane is determined as the lane in the video, whereas in the manner 3, a determined lane is corrected, to obtain the lane in the video.

In this embodiment of this disclosure, the video may be obtained in real time to determine the lane. Therefore, after a shooting angle of the monitoring device changes, the lane in the video may still be correctly determined.

Optionally, in a possible implementation, after the lane in the video is determined, the recognition apparatus may further determine a lane type of each lane. Specific processing is as follows.

The recognition apparatus determines a type of each vehicle based on a vehicle type detection algorithm, determines, based on types of the plurality of vehicles and the vehicle trajectories of the plurality of vehicles in the video, a lane type of each recognized lane in the video, where the lane type of the lane is used to indicate a type of a vehicle that can run on the lane.

The type of vehicles may include a car, a bus, a coach, and the like.

In this embodiment, the recognition apparatus may further input each video frame of the video into a vehicle type detection model, to obtain a type of a vehicle in each bounding box, that is, to obtain a type of each of the plurality of vehicles in the video.

Then, the recognition apparatus determines a vehicle trajectory included in each lane in the video. For any lane, the recognition apparatus determines a type of a vehicle to which the vehicle trajectory included in the lane belongs, and if the lane includes only one type of vehicle, determines the type as a lane type of the lane, or if the lane includes a plurality of types of vehicles, but a quantity of vehicle trajectories of one type of vehicle is much greater than a quantity of vehicle trajectories of other vehicles (where for example, a proportion of a quantity of vehicle trajectories of a type 1 of vehicle to a total quantity of vehicle trajectories is greater than 98%), the vehicle type with a larger proportion may be determined as a lane type of the lane. For example, a lane includes only a type of a bus, and the lane is a bus lane. If the lane includes a plurality of types of vehicles, and in vehicle trajectories of the various types of vehicles, a difference between quantities of vehicle trajectories of any two types of vehicles is less than a specific value, a lane type of the lane is determined to be a mixing type. In other words, various types of vehicles can run on the lane.

Optionally, in a possible implementation, the road on which the monitoring device performs recording includes an intersection, and the to-be-recognized area is an area at the intersection in the video. The recognition apparatus may obtain an extension video recorded by the monitoring device, where the extension video is a video recorded in a time period after the monitoring device records the video. To be specific, the video recorded in a time period after the monitoring device records the video is a video in which a vehicle runs on the lane toward the intersection in the recorded video in step 701. Herein, an example in which the monitoring device for recording the extension video and the monitoring device in step 701 are the same monitoring device is used for description, on the basis of a capability of the monitoring device in step 701 to record a video in which the vehicle passes the intersection. In a case in which the monitoring device in step 701 cannot capture the video in which the vehicle passes the intersection, the recognition apparatus may determine a monitoring device that is at a same intersection at which the monitoring device in step 701 is located and that can capture the vehicle passing the intersection, and then obtain a video recorded by the monitoring device in a time period after the video in step 701 is recorded (where the time period is relatively short, such as one minute), where the video is an extension video.

The recognition apparatus may determine vehicle trajectories (or extension vehicle trajectories) of the plurality of vehicles in the extension video in the manner shown in FIG. 7. Then, the recognition apparatus may determine vehicle trajectories of a same vehicle based on an attribute (such as a license plate number) of the vehicle that is in the plurality of vehicles and to which a vehicle trajectory in the extension video belongs and an attribute of the vehicle to which an obtained vehicle trajectory in step 702 belongs. The recognition apparatus determines a vehicle trajectory that is in the vehicle trajectories of the same vehicle and that is of the vehicle at the intersection as an extension vehicle trajectory corresponding to the obtained vehicle trajectory in step 702. After step 703, the recognition apparatus may further determine an attribute of each lane based on an extension vehicle trajectory, where the attribute of the lane is used to indicate a direction to which a vehicle running on the lane is allowed to run. Specific processing is as follows.

The recognition apparatus determines, based on the vehicle trajectories of the plurality of vehicles in the video and the vehicle trajectories of the plurality of vehicles in the extension video, an attribute of each lane in the video, where the attribute of each lane includes any one of the following attributes: a right-turn lane, a left-turn lane, a straight-through lane, a right-turn and straight-through lane, a left-turn and straight-through lane, and an all-purpose lane.

The right-turn lane is a lane for a vehicle to turn right only, the left-turn lane is a lane for a vehicle to turn left only, the straight-through lane is a lane for a vehicle to go straight only, the right-turn and straight-through lane is a lane for a vehicle to turn right or go straight, the left-turn and straight-through lane is a lane for a vehicle to turn left or go straight, the all-purpose lane is a lane for a vehicle to turn right, turn left, or go straight.

Figure 14:
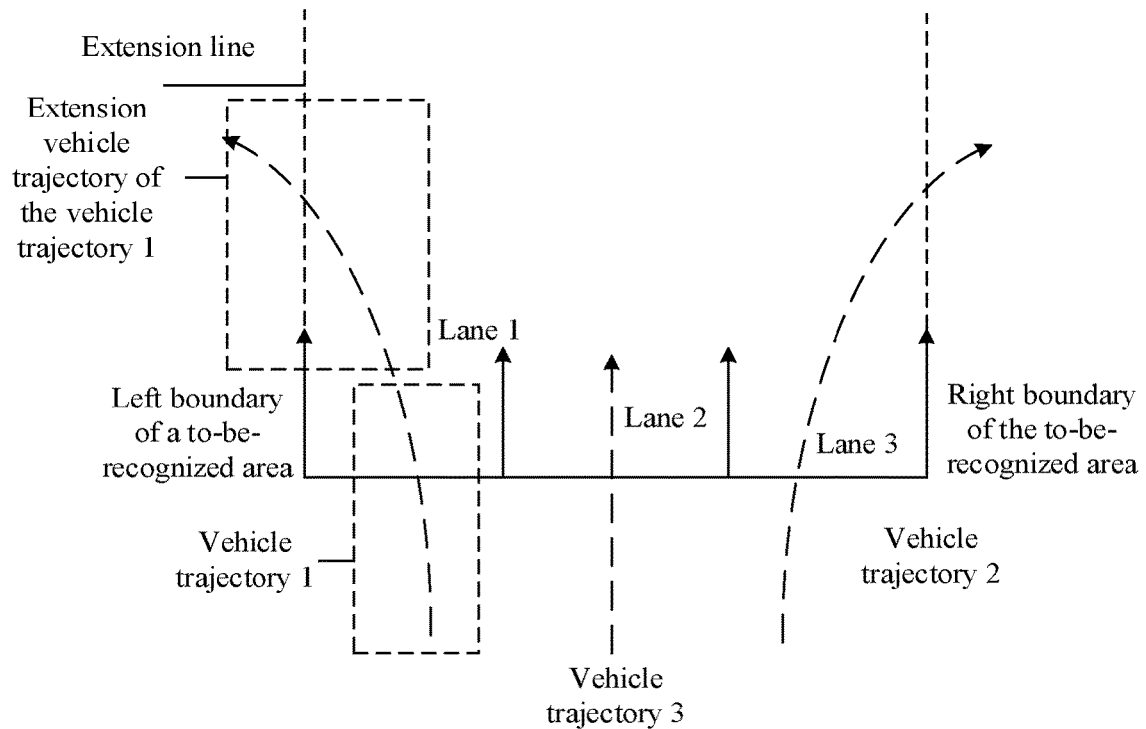
FIG. 14 is a schematic diagram of determining a relationship between a vehicle trajectory and an extension line of a boundary of a to-be-recognized area according to an example embodiment of this disclosure.

In this embodiment, for any lane in the video, the recognition apparatus may obtain an extension vehicle trajectory of a vehicle trajectory in the lane, and then determine whether an extension vehicle trajectory of each vehicle trajectory belonging to the lane intersects an extension line of a boundary of the to-be-recognized area. Based on a result of intersection or not, an attribute of the lane is determined. For example, FIG. 14 shows that an extension vehicle trajectory of a vehicle trajectory 1 intersects an extension line of the left boundary of the to-be-recognized area, an extension vehicle trajectory of a vehicle trajectory 2 intersects an extension line of the right boundary of the to-be-recognized area, and an extension vehicle trajectory of a vehicle trajectory 3 does not intersect the extension line of the left boundary of the to-be-recognized area or the extension line of the right boundary of the to-be-recognized area.

If extension vehicle trajectories of greater than or equal to M % (where for example, M is 97) of vehicle trajectories on a lane intersect the extension line of the left boundary of the to-be-recognized area, the lane is determined to be a left-turn lane. If extension vehicle trajectories of greater than or equal to M % of vehicle trajectories on a lane intersect the extension line of the right boundary of the to-be-recognized area, the lane is determined to be a right-turn lane. If extension vehicle trajectories of greater than or equal to M % of vehicle trajectories on a lane do not intersect the extension line of the left boundary of the to-be-recognized area or the extension line of the right boundary of the to-be-recognized area, the lane is determined to be a straight-through lane. If extension vehicle trajectories of one part of vehicle trajectories on a lane do not intersect the extension line of the left boundary of the to-be-recognized area, and extension vehicle trajectories of the other part of vehicle trajectories on the lane intersect the extension line of the right boundary of the to-be-recognized area, the lane is determined to be a right-turn and straight-through lane. If extension vehicle trajectories of one part of vehicle trajectories on a lane do not intersect the extension line of the right boundary of the to-be-recognized area, and extension vehicle trajectories of the other part of vehicle trajectories on the lane intersect the extension line of the left boundary of the to-be-recognized area, the lane is determined to be a left-turn and straight-through lane. In addition, if extension vehicle trajectories of one part of vehicle trajectories on a lane intersect the extension line of the left boundary of the to-be-recognized area, extension vehicle trajectories of another part of vehicle trajectories on the lane intersect the extension line of the right boundary of the to-be-recognized area, and extension vehicle trajectories of still another part of vehicle trajectories on the lane do not intersect the extension line of the right boundary or the extension line of the left boundary of the to-be-recognized area, the lane is determined to be an all-purpose lane. The all-purpose lane may be used for vehicles running to various directions. The boundaries of the to-be-recognized area are actually lane lines of lanes, and the lanes are a leftmost lane and a rightmost lane that are in the to-be-recognized area. For example, the to-be-recognized area is at an intersection at which a vehicle runs northward, and the left boundary of the to-be-recognized area is a left lane line of a leftmost lane of the intersection, and the right boundary of the to-be-recognized area is a right lane line of a rightmost lane of the intersection.

It should be noted that, to make an attribute of a determined lane more accurate, when the recognition apparatus determines an attribute of each lane by using a vehicle trajectory on each lane, a quantity of vehicle trajectories on each lane should be as large as possible. For example, the quantity should be greater than 50.

It should be further noted that, there may be a plurality of manners for the recognition apparatus to determine whether an extension vehicle trajectory of each vehicle trajectory on a lane intersects the extension line of the boundary of the to-be-recognized area, and the following manners and more manners not described herein may be used.

The recognition apparatus may determine whether points on an extension vehicle trajectory of a vehicle trajectory are distributed on both sides of the extension line of the boundary of the to-be-recognized area. If the points on the extension vehicle trajectory of the vehicle trajectory are distributed on both sides of the extension line of the boundary of the to-be-recognized area, it is determined that the extension vehicle trajectory of the vehicle trajectory intersects the extension line of the boundary of the to-be-recognized area, or if the points on the extension vehicle trajectory of the vehicle trajectory are not distributed on both sides of the extension line of the boundary of the to-be-recognized area, it is determined that the extension vehicle trajectory of the vehicle trajectory does not intersect the extension line of the boundary of the to-be-recognized area.

Optionally, after distribution of lanes in the to-be-recognized area in the video is determined, subsequently, the recognition apparatus may further determine a traffic flow on a lane with each moving direction, and adjust duration of traffic lights at an intersection by using an attribute of the lane and a traffic flow on each lane.

In a possible implementation, after step 703, the recognition apparatus may determine the traffic flow on the lane. Specific processing is as follows.

The recognition apparatus determines the traffic flow on the lane in the video.

In this embodiment, the recognition apparatus may determine a vehicle trajectory on the lane after determining the lane in the video, to further determine a quantity of vehicle trajectories on the lane within a time period, and determine the quantity of vehicle trajectories on the lane as the traffic flow on the lane in the video.

In addition, after determining the lane, the attribute of the lane, and the traffic flow on the lane that are in the video, the recognition apparatus may send the lane, the attribute of the lane, and the traffic flow on the lane to another device. The other device may perform corresponding processing based on the lane, the attribute of the lane, and the traffic flow on the lane that are in the video. For example, the other device may determine a traffic incident based on the lane in the video. For another example, the other device may control traffic lights at an intersection based on the traffic flow. For still another example, the other device may determine, based on the attribute of the lane in the video, whether a lane for a bus is occupied by another non-bus vehicle and the like.

In addition, in this embodiment of this disclosure, the recognition apparatus may further determine a running direction of a vehicle in a bounding box by using positions of the bounding box in two consecutive video frames (for example, if a distance between a position of the bounding box in a latter video frame and the top of the video frame is less than a distance between a position of the bounding box in a former video frame and the top of the video frame, it may be determined that a vehicle in the bounding box runs forward, and otherwise, the vehicle in the bounding box runs backward), so that a running direction of a vehicle on a lane can be further determined. In addition, the recognition apparatus may further determine whether the monitoring device is installed forwardly or reversely. Forward installation means that the monitoring device captures the rear of a vehicle, and reverse installation means that the monitoring device captures the front of the vehicle. Further, if a distance between a position of the bounding box in the latter video frame and the top of the video frame is less than a distance between a position of the bounding box in the former video frame and the top of the video frame, it may be determined that the monitoring device is installed reversely, and otherwise, the monitoring device is installed forwardly.

In addition, in the embodiments of this disclosure, a lane is recognized without relying on recognizing a lane line captured in a video frame. Therefore, the lane can be recognized even when a lane line in a recorded video is blurry due to a low level of illumination or bad weather.

In addition, in the embodiments of this disclosure, the recognition apparatus in step 701 may obtain a video from the monitoring device in real time, so that the lane in the video may be determined in real time.

In the embodiments of this disclosure, the recognition apparatus may obtain the video recorded by the monitoring device set up on a road, where the video records a plurality of vehicles running on the road, and determine positions of each vehicle in a plurality of video frames of the video. Then, a vehicle trajectory of each vehicle in the video is determined based on the positions of the vehicle in the plurality of video frames of the video, and finally, the lane in the video is determined based on the vehicle trajectory of each vehicle in the video. In this way, because the recognition apparatus can dynamically determine the lane in the video based on the video, and manual pre-determining is not required, even if a shooting angle of the monitoring device changes, the recognition apparatus can obtain a lane in the video after the angle change in a timely manner, thereby improving accuracy of a result of analyzing a traffic event.

Figure 15:
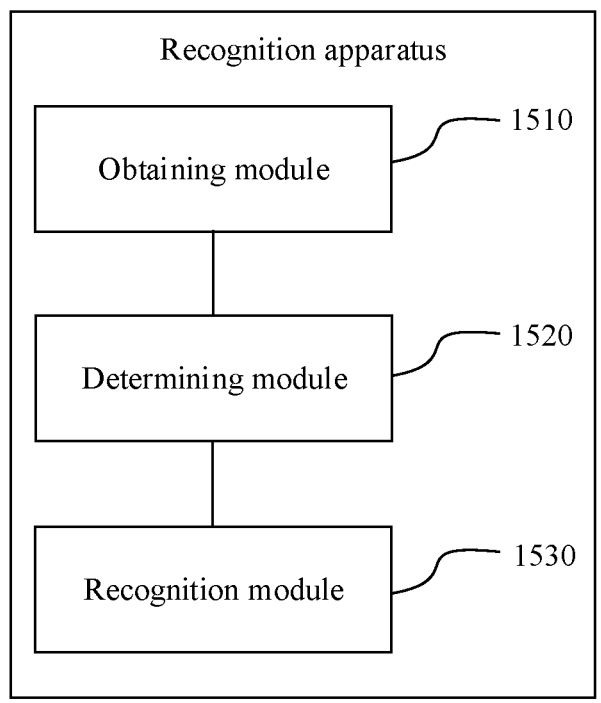
FIG. 15 is a schematic diagram of a structure of an apparatus for lane recognition according to an example embodiment of this disclosure.

FIG. 15 is a diagram of a structure of an apparatus for lane recognition (that is, a recognition apparatus) according to an embodiment of this disclosure. The recognition apparatus may be implemented as a part or all of the recognition apparatus by software, hardware, or a combination thereof. The recognition apparatus provided in this embodiment of this disclosure may implement procedures described in FIG. 7 and FIG. 9 in the embodiments of this disclosure. The recognition apparatus includes an obtaining module 1510, a determining module 1520, and a recognition module 1530.

The obtaining module 1510 is configured to obtain a video recorded by a monitoring device set up on a road, where the video records a plurality of vehicles running on the road, and may be further configured to implement an obtaining function in step 701 and perform an implicit step included in step 701.

The determining module 1520 is configured to determine positions of each of the plurality of vehicles in a plurality of video frames of the video, and determine a vehicle trajectory of each vehicle in the video based on the positions of the vehicle in the plurality of video frames of the video. The determining module 1520 may be further configured to implement a determining function in step 702 and perform an implicit step included in step 702.

The recognition module 1530 is configured to recognize at least one lane in the video based on vehicle trajectories of the plurality of vehicles in the video. The recognition module 1530 may be further configured to implement a recognition function in step 703 and perform an implicit step included in step 703.

In a possible implementation, the determining module 1520 is further configured to determine a type of each vehicle based on a vehicle type detection model, and determine, based on types of the plurality of vehicles and the vehicle trajectories of the plurality of vehicles in the video, a lane type of each recognized lane in the video, where the lane type is used to indicate a type of a vehicle that can run on the lane.

In a possible implementation, the determining module 1520 is further configured to, when the road on which the monitoring device performs recording includes an intersection, obtain an extension video recorded by the monitoring device, where the extension video is a video recorded in a time period after the monitoring device records the video, determine vehicle trajectories of the plurality of vehicles in the extension video, and determine, based on the vehicle trajectories of the plurality of vehicles in the video and the vehicle trajectories of the plurality of vehicles in the extension video, an attribute of each recognized lane in the video, where the attribute of each lane includes any one of the following attributes or a combination thereof: a right-turn lane, a left-turn lane, a straight-through lane, a right-turn and straight-through lane, a left-turn and straight-through lane, and an all-purpose lane.

In a possible implementation, the recognition module 1530 is further configured to determine a distance between a vehicle trajectory of a first vehicle and an adjacent lane in the video, where the adjacent lane is a lane that is in the recognized lane and that is nearest to the vehicle trajectory of the first vehicle, compare the distance and a pixel width of the first vehicle, and determine that the distance is greater than the pixel width of the first vehicle, and determine a new lane based on the vehicle trajectory of the first vehicle, where the new lane is a lane in the at least one recognized lane.

In a possible implementation, the determining module 1520 is further configured to calculate a traffic flow on each lane in the video.

In a possible implementation, the recognition module 1530 is further configured to, when a quantity of the recognized lanes is not equal to a preset quantity, obtain at least one corrected lane in the video based on the preset quantity and the vehicle trajectory of each vehicle in the video.

The preset quantity is an actual quantity of detected lanes in the video.

In a possible implementation, the determining module 1520 is further configured to determine a to-be-recognized area in the video.

The recognition module 1530 is further configured to recognize at least one lane in the to-be-recognized area in the video based on vehicle trajectories of the plurality of vehicles in the to-be-recognized area in the video.

In a possible implementation, the obtaining module 1510 is further configured to receive in real time a video stream recorded by the monitoring device set up on the road, or periodically obtain the video recorded by the monitoring device set up on the road.

In a more specific embodiment, the obtaining module 1510 is configured to perform procedures of obtaining the video recorded by the monitoring device in FIG. 7. The determining module 1520 is configured to perform procedures of determining the vehicle trajectory in FIG. 7. The recognition module 1530 is configured to perform a process of recognizing the lane in the video in FIG. 7 and procedures shown in FIG. 9.

Division into the modules in this embodiment of this disclosure is an example, and is merely logical function division. During actual implementation, another division manner may be used. In addition, the functional modules in the embodiments of this disclosure may be integrated in one processor, or may exist as physically independent. Alternatively, two or more modules may be integrated into one module. The integrated module may be implemented in a form of hardware, or may be implemented in a form of a software functional module.

This disclosure further provides a computing device 400 shown in FIG. 4, and a processor 402 in the computing device 400 reads a series of computer instructions stored in the memory 401 to perform the foregoing method for lane recognition.

Descriptions of procedures corresponding to the foregoing figures have different focuses. For a part in a procedure not described in detail, refer to related descriptions of other procedures.

All or some of the foregoing embodiments may be implemented by using software, hardware, firmware, or any combination thereof. When software is used to implement the embodiments, all or some of the embodiments may be implemented in a form of a computer program product. The computer program product for implementing lane recognition includes one or more lane recognition computer instructions. When the computer program instructions are loaded and executed on a computer, all or some of the procedures described in FIG. 7 and FIG. 9 in the embodiments of this disclosure are implemented, or functions of the apparatus described in FIG. 15 in the embodiments of this disclosure are implemented.

The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium stores computer program instructions for implementing blind spot detection of a vehicle. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DIGITAL VERSATILE DISC (DVD)), or a semiconductor medium (for example, a solid-state drive (SSD)).

What is claimed is:

1. A method for lane recognition comprising:
    obtaining, from a monitoring device on a road, a video that records a plurality of vehicles travelling on the road; and
    recognizing at least one lane in the video based on first vehicle trajectories of the vehicles in the video,
    wherein the first vehicle trajectories are based on positions of each of the vehicles in a plurality of video frames of the video, wherein each trajectory of the first vehicle trajectories corresponds to a respective vehicle of the vehicles, wherein a lane type of each of the at least one lane is based on types of the vehicles and the first vehicle trajectories, wherein the types are based on a vehicle type detection model, and wherein the lane type indicates a type of a vehicle that can travel on the at least one lane.

2. The method of claim 1, wherein the road comprises an intersection, wherein the method further comprises obtaining, from the monitoring device, an extension video that is recorded in a time period after the video, wherein an attribute of each of the at least one lane is based on the first vehicle trajectories and second vehicle trajectories of the vehicles in the extension video, and wherein the attribute comprises one or more of:
 a right-turn lane;
 a left-turn lane;
 a straight-through lane;
 a right-turn and straight-through lane;
 a left-turn and straight-through lane; or
 an all-purpose lane.

3. The method of claim 1, further comprising:
 calculating a distance between a vehicle trajectory of a first vehicle of the vehicles and an adjacent lane in the video, wherein the adjacent lane is in the at least one lane and is nearest to the vehicle trajectory of the first vehicle;
 comparing the distance and a pixel width of the first vehicle; and
 recognizing, based on the vehicle trajectory of the first vehicle, a new lane that is in the at least one lane.

4. The method of claim 1, further comprising calculating a traffic flow on each of the at least one lane.

5. The method of claim 1, further comprising:
 identifying that a quantity of recognized lanes is not equal to a preset quantity, wherein the preset quantity is an actual quantity of detected lanes in the video; and
 obtaining, in response to identifying that the quantity of recognized lanes is not equal to the preset quantity, at least one corrected lane in the video based on the preset quantity and the first vehicle trajectories.

6. The method of claim 1, further comprising:
 receiving, from the monitoring device and in real time, a video stream comprising the video; or
 periodically obtaining, from the monitoring device, the video.

7. A computing device for lane recognition and comprising:
 a memory configured to store computer instructions; and
 a processor coupled to the memory, wherein the computer instructions cause the processor to be configured to:
 obtain, from a monitoring device on a road, a video that records a plurality of vehicles travelling on the road; and
 recognize at least one lane in the video based on first vehicle trajectories of the vehicles in the video,
 wherein the first vehicle trajectories are based on positions of each of the vehicles in a plurality of video frames of the video,
 wherein each trajectory of the first vehicle trajectories corresponds to a respective vehicle of the vehicles,
 wherein a lane type of each of the at least one lane is based on types of the vehicles and the first vehicle trajectories,
 wherein the types are based on a vehicle type detection model, and
 wherein the lane type indicates a type of a vehicle that can travel on the at least one lane.

8. The computing device of claim 7, wherein the road comprises an intersection, wherein the computer instructions further cause the processor to be configured to obtain, from the monitoring device, an extension video that is recorded in a time period after the video, wherein an attribute of each of the at least one lane is based on the first vehicle trajectories and second vehicle trajectories of the vehicles in the extension video, and wherein the attribute comprises one or more of:
 a right-turn lane;
 a left-turn lane;
 a straight-through lane;
 a right-turn and straight-through lane;
 a left-turn and straight-through lane; or
 an all-purpose lane.

9. The computing device of claim 7, wherein the computer instructions further cause the processor to be configured to:
 calculate a distance between a vehicle trajectory of a first vehicle of the vehicles and an adjacent lane in the video, wherein the adjacent lane is in the at least one lane and is nearest to the vehicle trajectory of the first vehicle;
 compare the distance and a pixel width of the first vehicle; and
 recognize, based on the vehicle trajectory of the first vehicle, a new lane that is in the at least one lane.

10. The computing device of claim 7, wherein the computer instructions further cause the processor to be configured to calculate a traffic flow on each of the at least one lane.

11. The computing device of claim 7, wherein the computer instructions further cause the processor to be configured to:
 identify that a quantity of recognized lanes is not equal to a preset quantity, wherein the preset quantity is an actual quantity of detected lanes in the video; and
 obtain at least one corrected lane in the video based on the preset quantity and the first vehicle trajectories.

12. The computing device of claim 7, wherein the computer instructions further cause the processor to be configured to:
 receive, from the monitoring device and in real time, a video stream comprising the video; or
 periodically obtain, from the monitoring device, the video.

13. A computer program product comprising computer-executable instructions that are stored on a non-transitory computer-readable storage medium and that, when executed by a processor, cause a computing device to:
 obtain, from a monitoring device on a road, a video that records a plurality of vehicles travelling on the road; and
 recognize at least one lane in the video based on the first vehicle trajectories of the vehicles in the video, wherein the first vehicle trajectories are based on positions of each of the vehicles in a plurality of video frames of the video,
 wherein each trajectory of the first vehicle trajectories corresponds to a respective vehicle of the vehicles,
 wherein a lane type of each of the at least one lane based on types of the vehicles and the first vehicle trajectories, wherein the types are based on a vehicle type detection model, and
wherein the lane type indicates a type of a vehicle that can travel on the at least one lane.

14. The computer program product of claim 13, wherein the road comprises an intersection, wherein the computer-executable instructions further cause the computing device to obtain, from the monitoring device, an extension video that is recorded in a time period after the video, wherein an attribute of each of the at least one lane is based on the first vehicle trajectories and second vehicle trajectories of the vehicles in the extension video, and wherein the attribute comprises one or more of:
- a right-turn lane;
- a left-turn lane;
- a straight-through lane;
- a right-turn and straight-through lane;
- a left-turn and straight-through lane; or
- an all-purpose lane.

15. The computer program product of claim 13, wherein the computer-executable instructions further cause the computing device to:
calculate a distance between a vehicle trajectory of a first vehicle and an adjacent lane in the video, wherein the adjacent lane is in the at least one lane and is nearest to the vehicle trajectory of the first vehicle;
compare the distance and a pixel width of the first vehicle; and
recognize, based on the vehicle trajectory of the first vehicle, a new lane that is in the at least one lane.

16. The computer program product of claim 13, wherein the computer-executable instructions further cause the computing device to calculate a traffic flow on each of the at least one lane.

17. The computer program product of claim 13, wherein the computer-executable instructions further cause the computing device to:
identify that a quantity of recognized lanes is not equal to a preset quantity, wherein the preset quantity is an actual quantity of detected lanes in the video; and
obtain at least one corrected lane in the video based on the preset quantity and the first vehicle trajectories.

18. The computer program product of claim 13, wherein the computer-executable instructions further cause the computing device to receive, from the monitoring device and in real time, a video stream comprising the video.

19. The computer program product of claim 13, wherein the computer-executable instructions further cause the computing device to periodically obtain, from the monitoring device, the video.

20. The computer program product of claim 13, wherein the vehicle type detection model is an artificial intelligence (AI) model.

* * * * *